United States Patent [19]

Guidoux

[11] 3,868,603

[45] Feb. 25, 1975

[54] AUTOMATIC EQUALIZING ARRANGEMENT FOR A DATA TRANSMISSION CHANNEL

[75] Inventor: Loic Bernard Yves Guidoux, Saint Michel sur Orge, France

[73] Assignee: Telecommunications Radioelectriques et Telephoniques T.R.T., Paris, France

[22] Filed: Mar. 8, 1974

[21] Appl. No.: 449,278

[30] Foreign Application Priority Data

Mar. 9, 1973 France .............................. 73.08476
June 25, 1973 France .............................. 73.23052

[52] U.S. Cl. ...................................... 333/18, 325/42
[51] Int. Cl. ............................................. H04b 3/04
[58] Field of Search........ 325/42, 323; 333/18, 70 T

[56] References Cited

UNITED STATES PATENTS 3,524,169 8/1970 McAuliffe et al................. 333/18 X
3,699,321 10/1972 Gibson.............................. 333/18 X

*Primary Examiner*—Paul L. Gensler
*Attorney, Agent, or Firm*—Frank R. Trifari; Simon L. Cohen

[57] ABSTRACT

An automatic adaptive equalizing arrangement for data transmission channels, including a non-recursive section in the form of an adjustable transversal filter arranged between output of the transmission channel and input of the decision circuit and also a recursive section, if any, in the form of an adjustable transversal filter arranged between output and input of the decision circuit. The transversal filter coefficients are adjusted in accordance with a criterion for minimizing the mean-square error. By also adjusting the sampling phase in accordance with the same criterion a considerable improvement in the equalization quality is achieved, while generally the transmission of a training sequence for starting the equalization prior to the actual data transmission is not necessary.

16 Claims, 17 Drawing Figures

AUTOMATIC EQUALIZING ARRANGEMENT FOR A DATA TRANSMISSION CHANNEL

The invention relates to an automatic equalizing arrangement for a data transmission channel, including a first transversal filter coupled between a first sampler for the data signal at the output of the transmission channel and a data-restoring decision circuit, the coefficients of the first transversal filter being adjusted by a coefficent adjusting arrangement in a first control loop so as to minimize a predetermined function of an error signal originating from a difference producer connected between input and output of the decision circuit and being applied to said first control loop. The predetermined function of the error signal, which is generally used, is the mean-square error.

Such an arrangement is among the group of automatic adaptive equalizers in which the equalization, i.e. the compensation for the amplitude and delay distortions caused by the transmission channel is automatically performed during data transmission. This equalization is particularly necessary for restoring the data at the receiver end when the data are transmitted at a high speed and at a large number of levels, for example, 3,200 Baud and eight levels. An automatic adaptive equalizer of the above-mentioned type in which the only adjustable element is constituted by a transversal filter is described, for example, in the Article by Niessen and Willim "Adaptive Equalizer for Pulse Transmission" in IEEE Transactions, Vol. COM—18, No. 4, August 1970, pages 377 - 394. A similar equalizer is likewise described in the Article by Proakis and Miller: "An Adaptive Receiver for Digital Signalling through Channels with Intersymbol Interference" in IEEE Transactions, Vol. IT—15, No. 4, July 1969, pages 484-496.

In addition to this type of non-recursive equalizer a second type of equalizer is known in which the output samples are constituted by the weighted sum of previous output samples as well as previous and/or present input samples. This second type of recursive equalizer is described, for example, in the Article by George, Bowen and Storey "An Adaptive Decision Feedback Equalizer" in IEEE Transactions, Vol. COM—19, No. 3, June 1971, pages 281–292. This second type of equalizer includes a non-recursive section in the form of an adjustable transversal filter, arranged between the output of the transmission channel and the input of the decision circuit, and a recursive section likewise in the form of an adjustable transversal filter, arranged between the output and the input of the decision circuit.

Comparative experiments performed by the applicant have proved that, dependent on the prevailing type of distortions (amplitude distortion or delay distortion) and on the frequency charateristics of these distortions, certain transmission channels can be suitably corrected by both types of equalizers, whereas in a manner which is not immediately predictable other transmission channels are much better corrected by one type of equalizer and very poorly corrected by the other type of equalizer.

The equalizers of the non-recursive type generally yield satisfactory results when the amplitude and delay distortions of the transmission channel give rise to intersymbol interference of adjacent symbols, i.e. symbols which are transmitted during the continuance of the pulse response of the transmission channel (for example, 2 msec). The equalizers of the recursive type are preferred when the transmission channel not only exhibits the said distortions but also echo phenomena which give rise to intersymbol interference between comparatively far remote symbols, for example, between a symbol transmitted at a certain instant and the echo of a symbol transmitted 15 msec before this instant.

Furthermore the equalizers of the recursive type generally require a smaller number of coefficients, but they have the drawback that due to their structure error multiplication occurs so that it is necessary in practice to transmit a pseudo-random training sequence prior to the actual data transmission. The recognition of this training sequence at the receiver end then, however, leads to synchronization problems. The equalizers of the non-recursive type do not have this drawback and may function without transmission of a training sequence if the error rate prior to equalization does not exceed a certain value which is not troublesome (for example, an error rate of 20 percent). However, these non-recursive equalizers cannot correct certain transmission channels unless an excessively large number of coefficients is used which is not compatible with the aim for cost reduction.

An object of the invention is to provide a novel conception of an automatic equalizing arrangement of the kind described in the preamble which with simplicity in construction provides both for a non-recursive structure and for a recursive structure a considerable improvement in the quality of equalization as compared with that in known equalizers and which generally renders the transmission of a training sequence prior to data transmission superfluous.

The automatic equalizing arrangement according to the invention is characterized in that means are provided for varying the phase of the sampling instants so as to minimize the predetermined function of the error signal, which means for varying the phase of the sampling instants include a phase adjusting arrangement in a second control loop, said error signal being applied to said second control loop.

When using the steps according to the invention both the filter coefficients and the phase of the sampling instants are utilized to minimize the said predetermined function of the error signal (in practice the mean-square error) so that it is possible to satisfactorily correct transmission channels which are very poorly corrected by the known equalizers without increasing the number of filter coefficients, and conversely to obtain the same quality of equalization with a lower number of filter coefficients. In addition these steps lead to a more rapid acquisition of the equalization.

The invention will now be described in greater detail with reference to the Figures.

Figure 1:
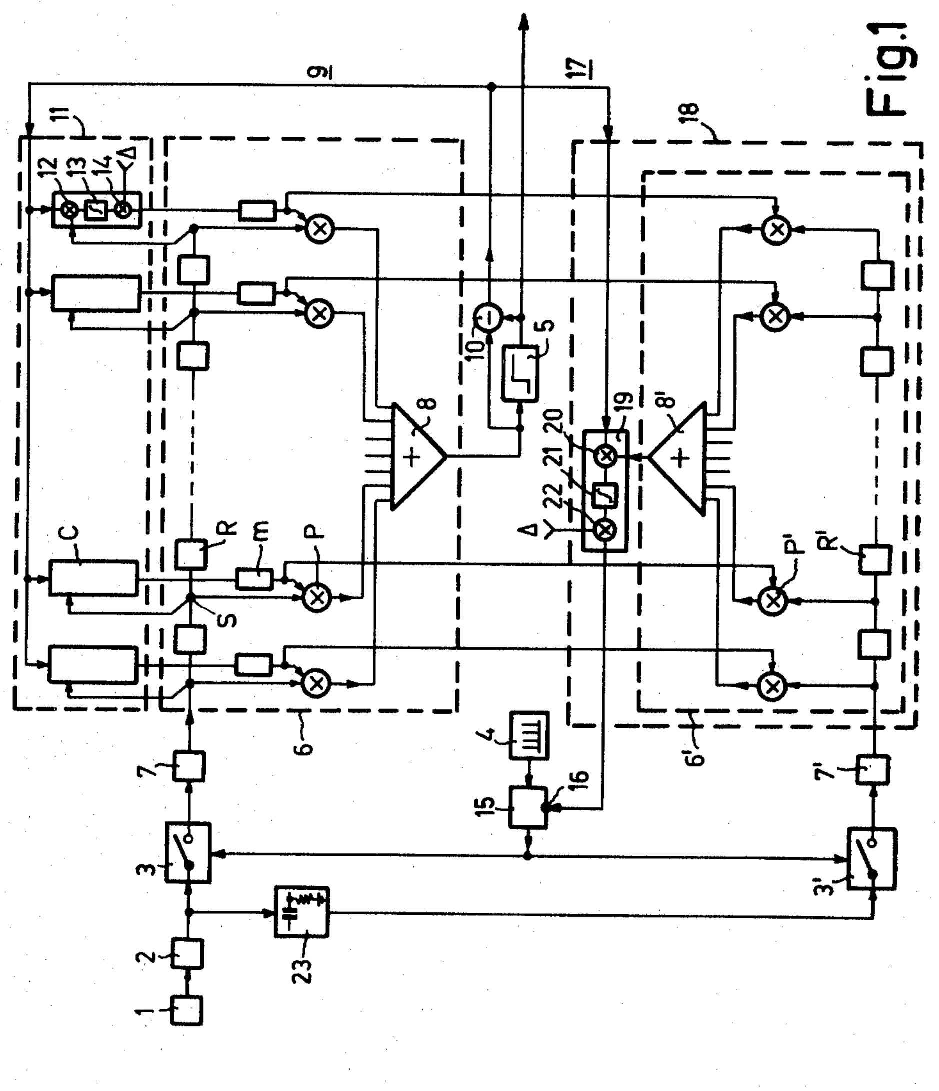
FIG. 1 shows the circuit diagram of an equalizing arrangement according to the invention, provided with a sampler having a variable phase.
Figure 3:
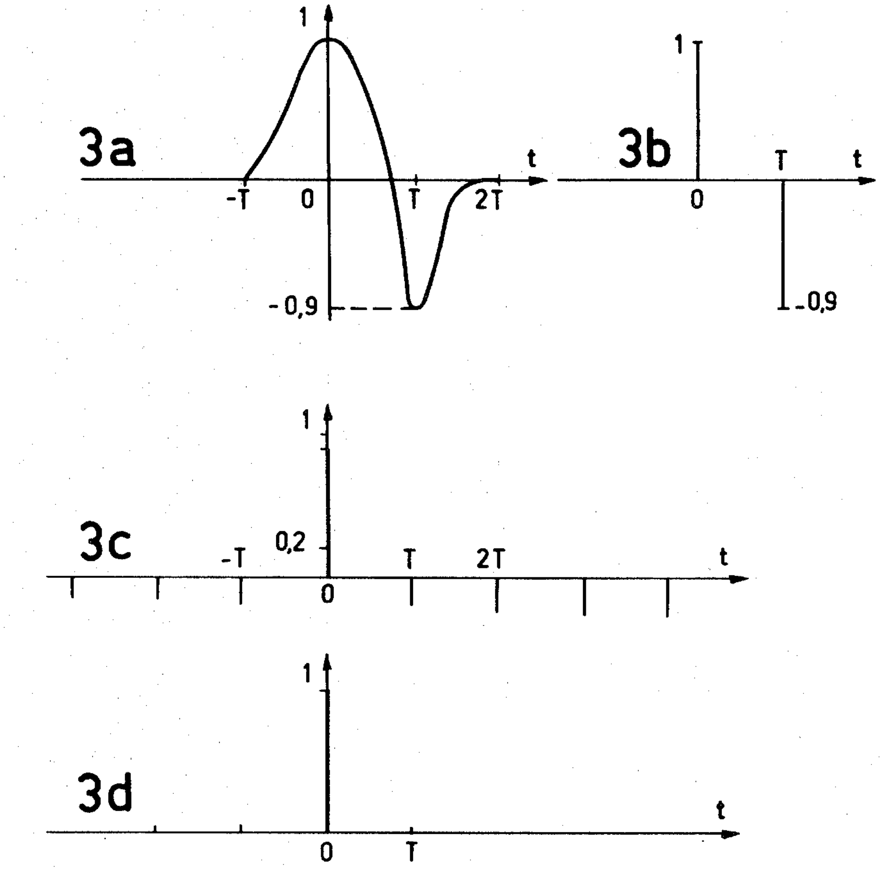
Figure 4:
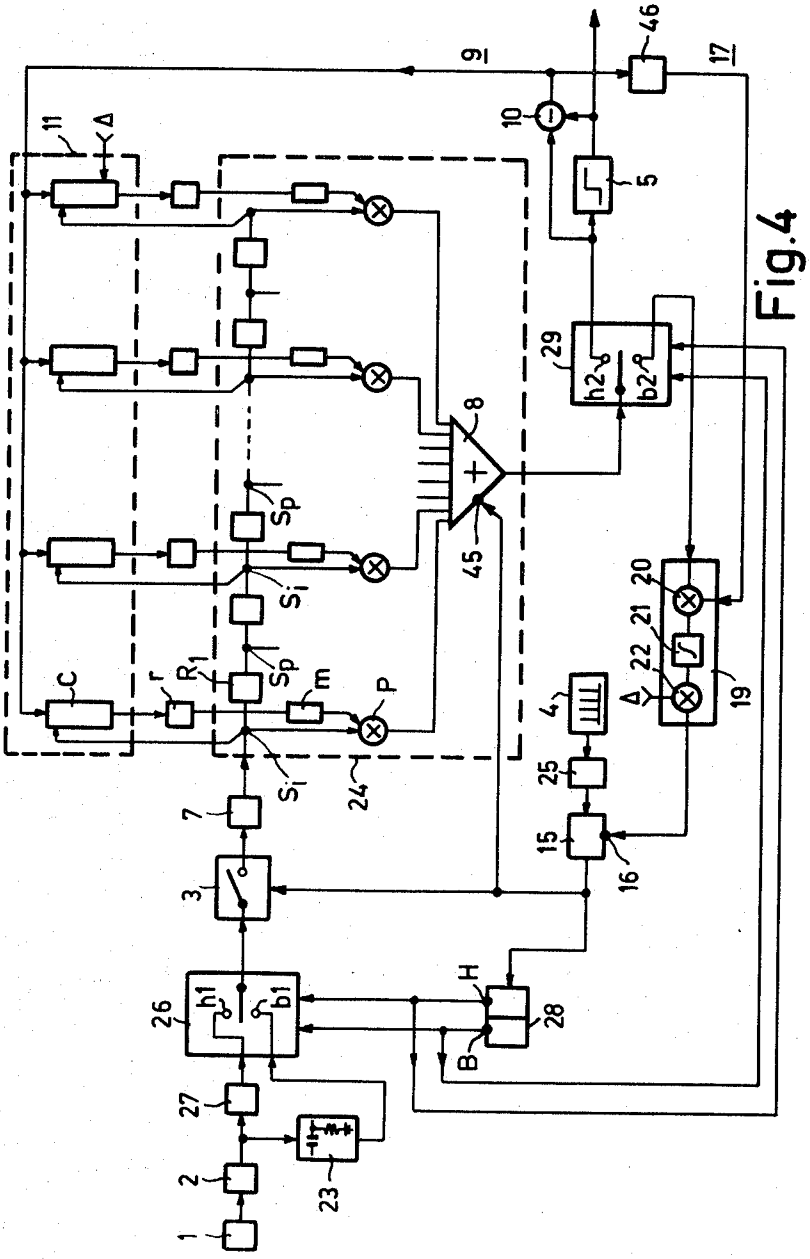
Figure 5:
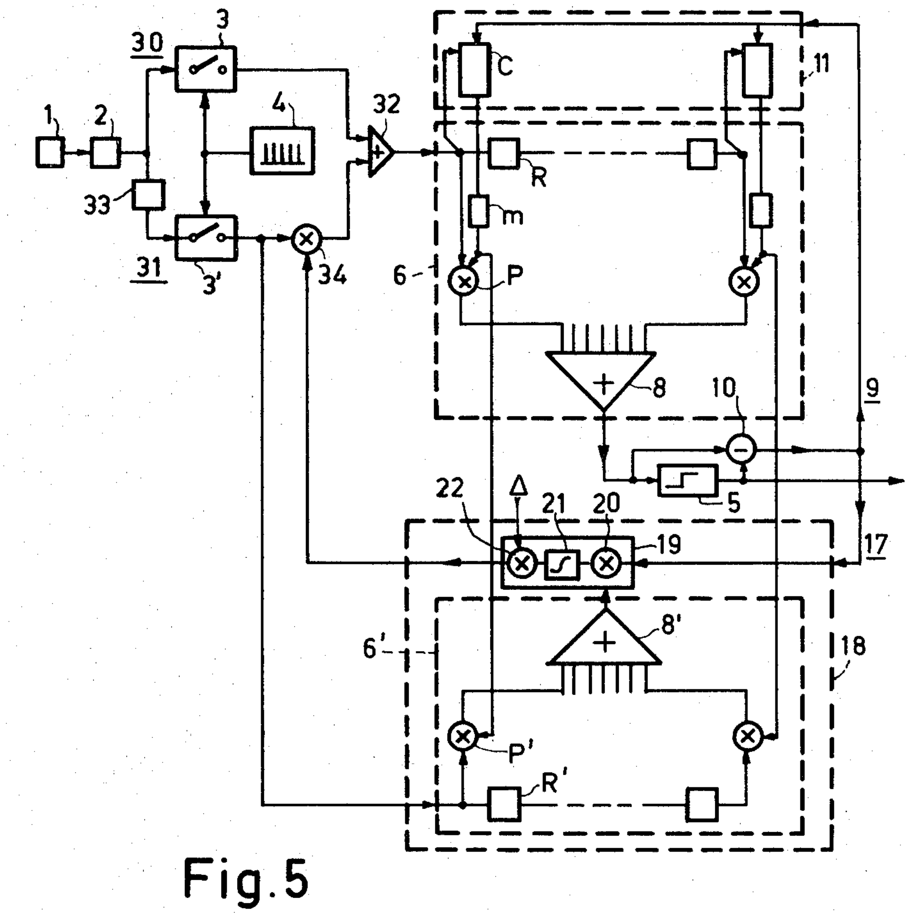
Figure 6:
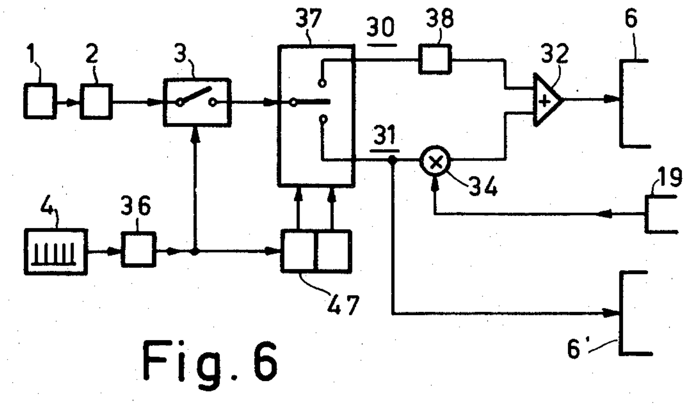
Figure 7:
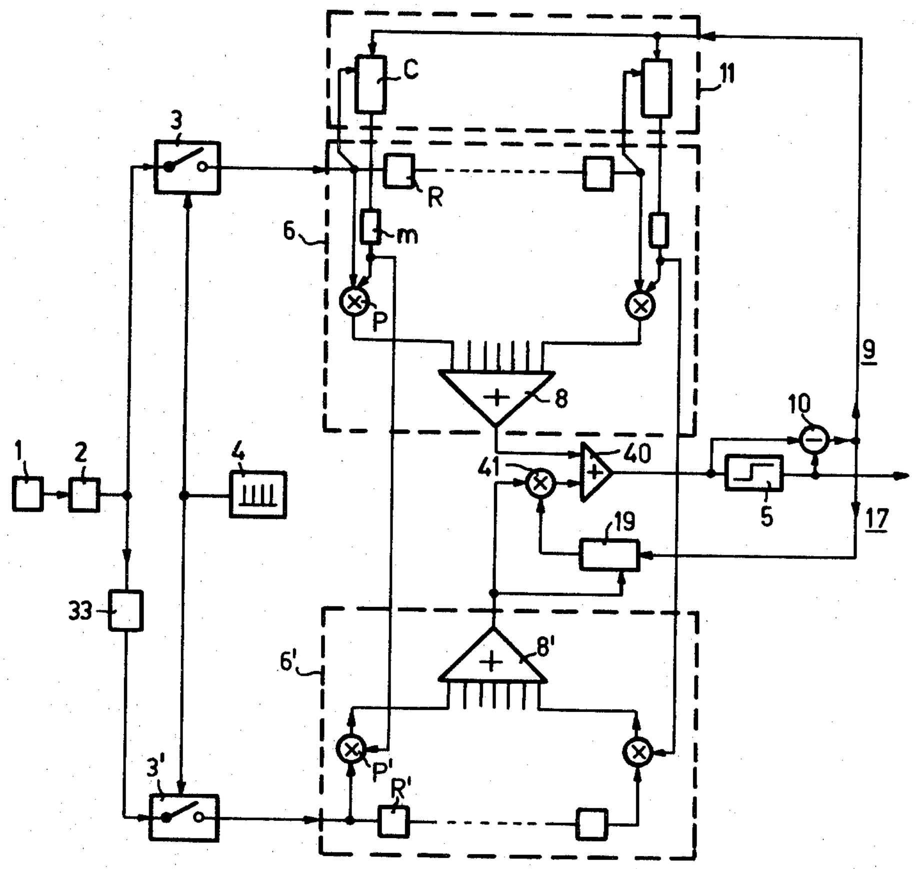
Figure 8:
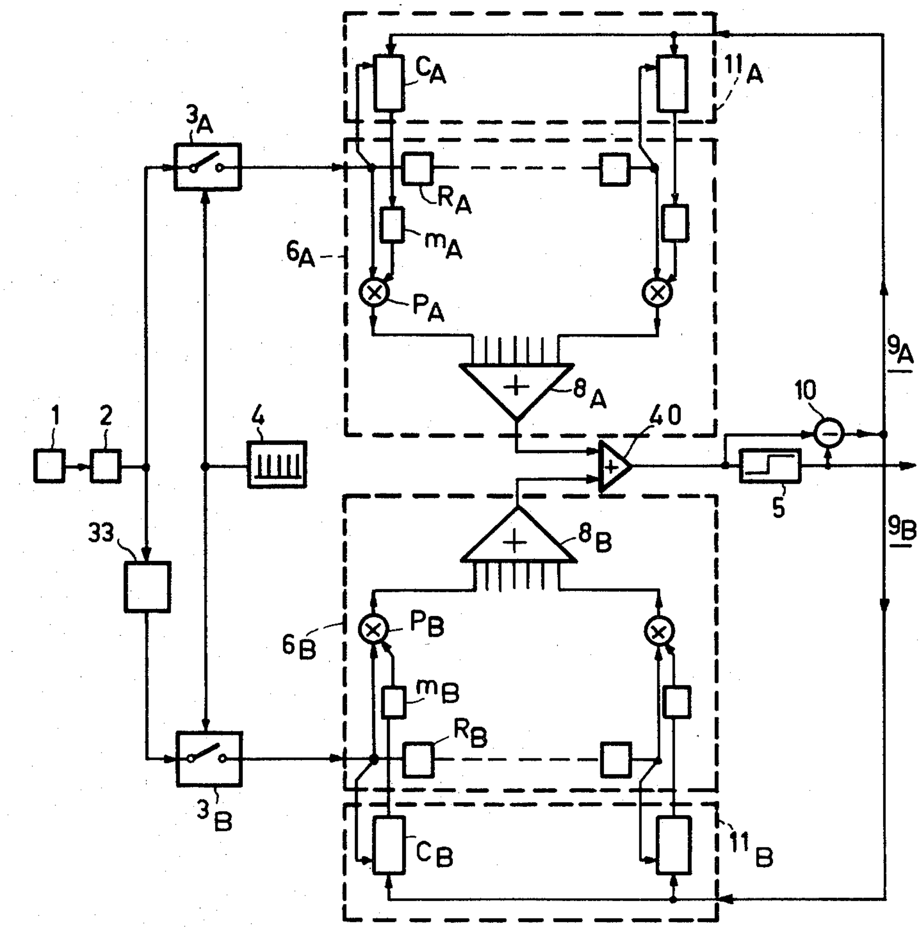
Figure 9:
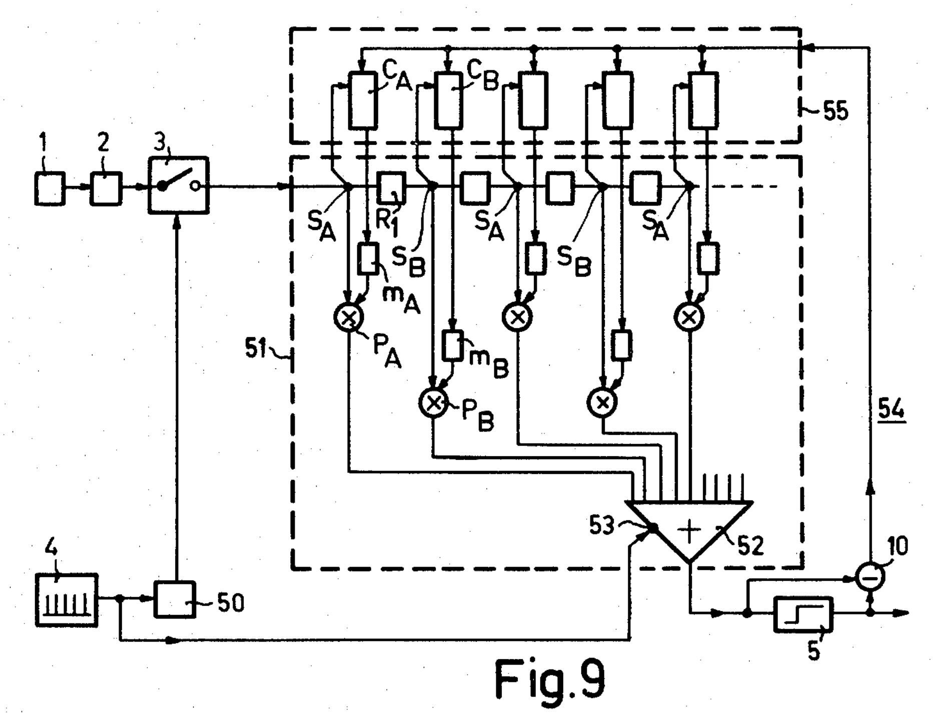
Figure 10:
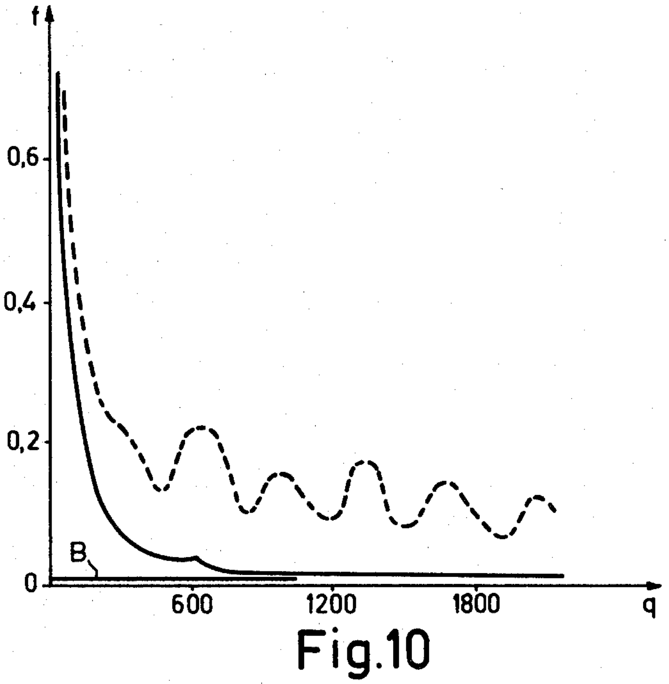
Figure 11:
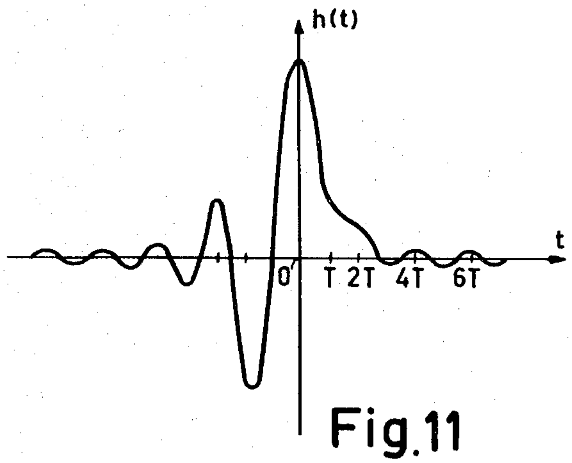
Figure 12:
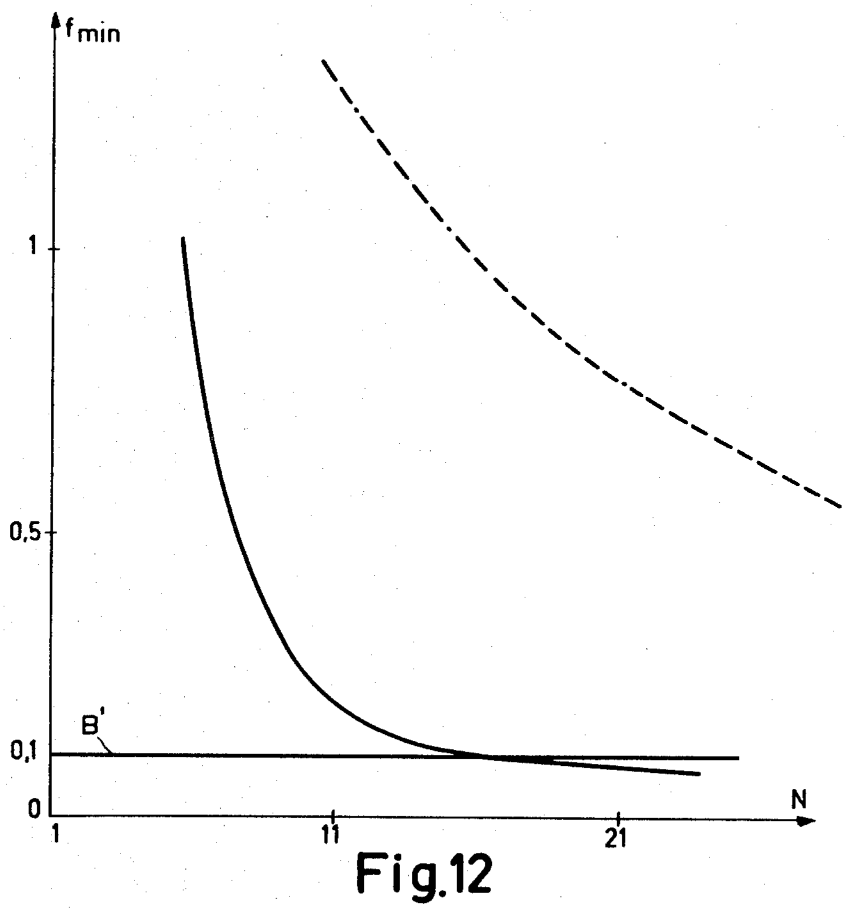
Figure 13:
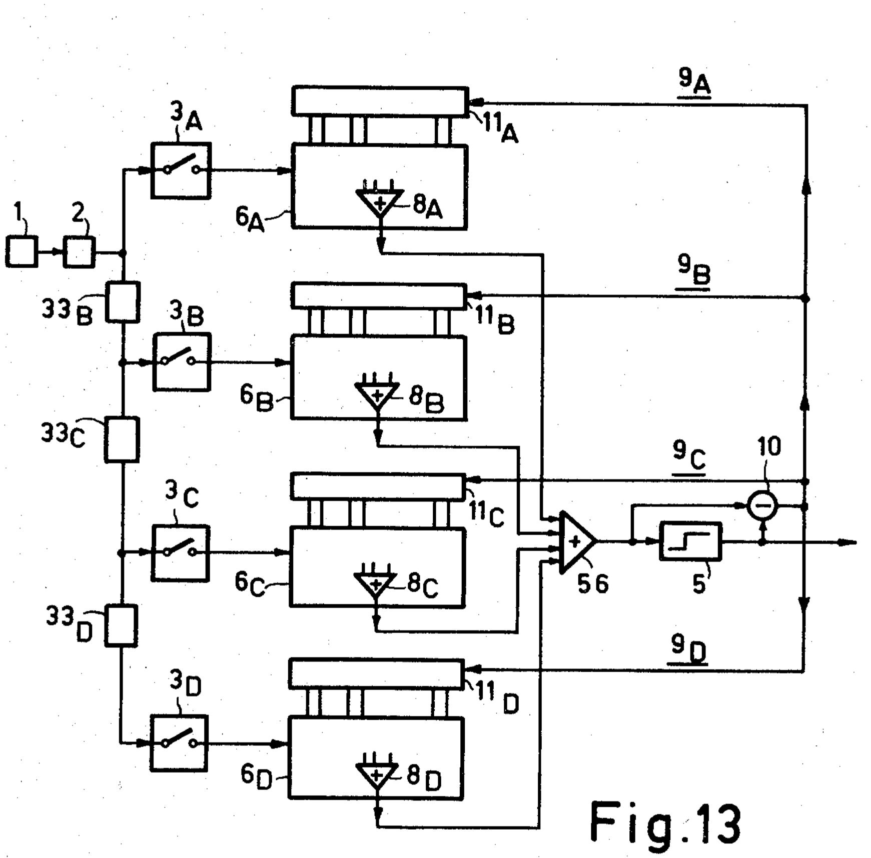
Figure 14:
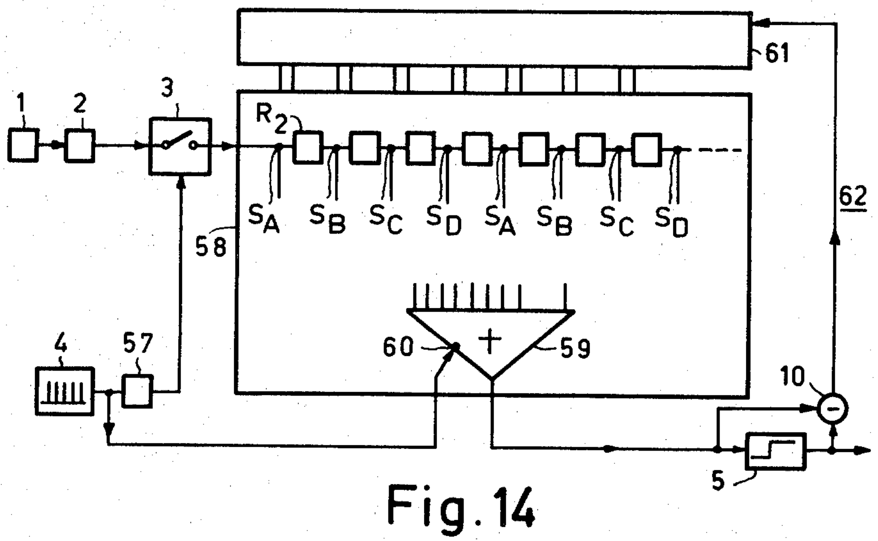
Figure 15:
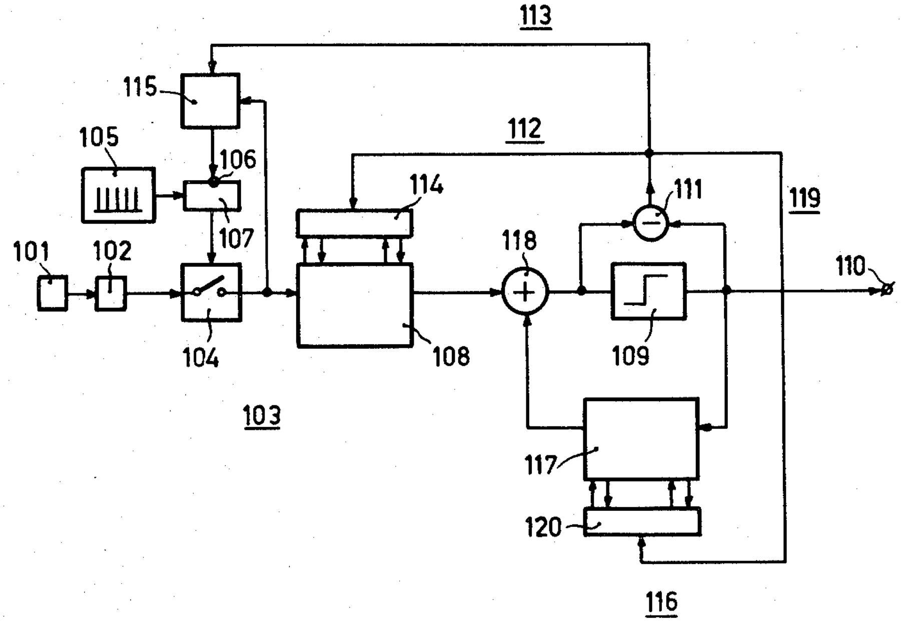
Figure 16:
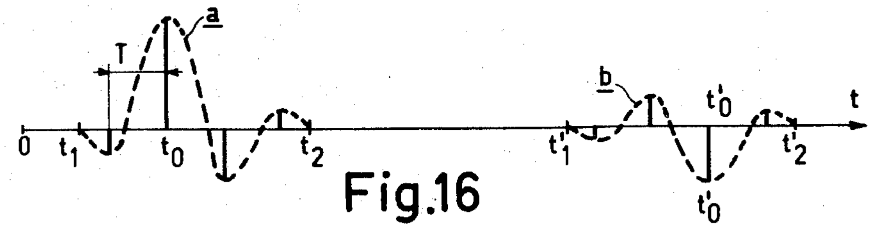
Figure 17:
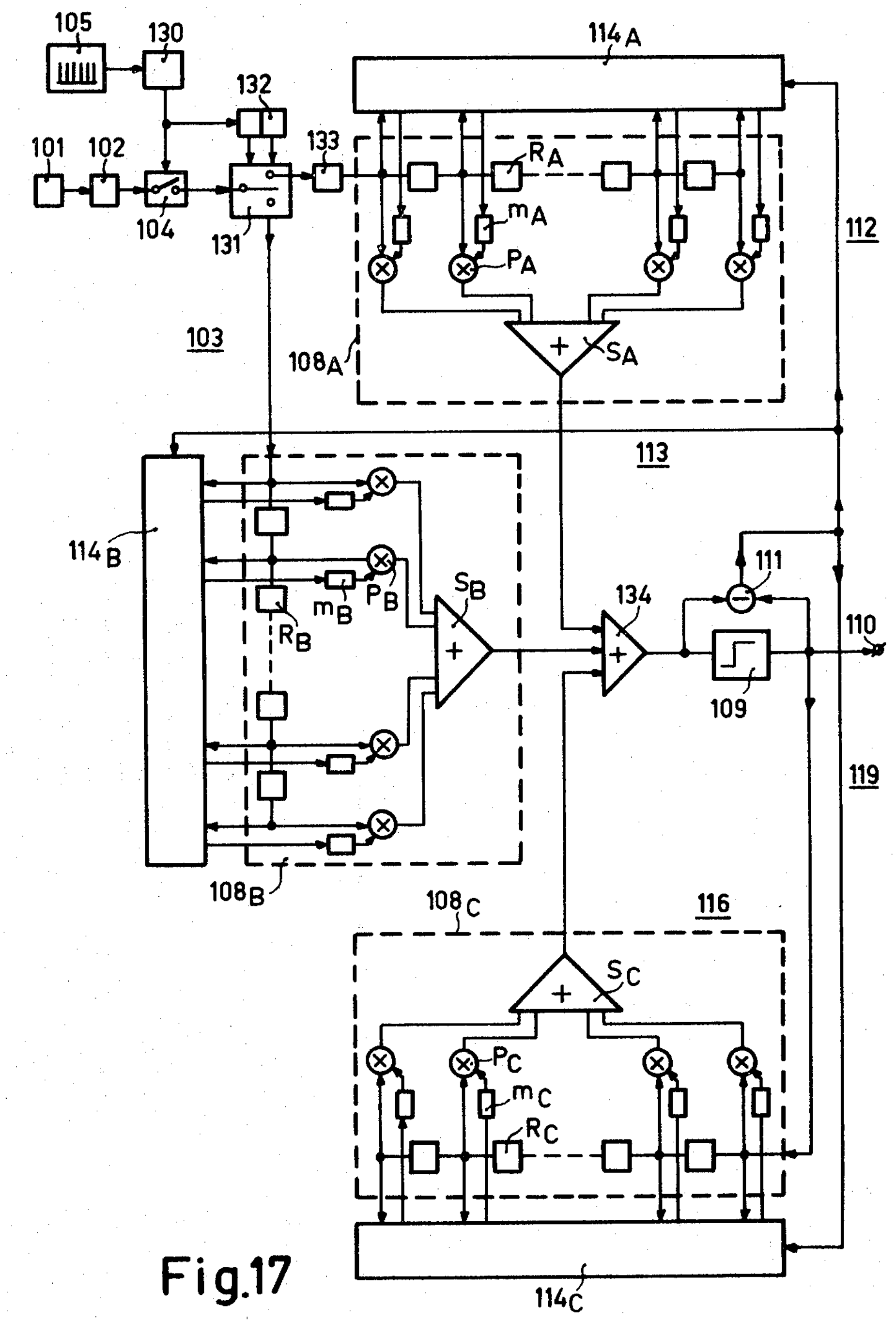

FIG. 3 shows a special example of an impulse response prior to sampling, after sampling and after equalization by a known equalizing arrangement and by an equalizing arrangement according to the invention, FIG. 4 shows a circuit diagram of an equalizing arrangement derived from the diagram of FIG. 1, FIG. 5 shows the circuit diagram of an equalizing arrangement according to the invention, provided with a sampler having a fixed phase and a linear interpolator having a variable parameter for the interpolation, FIG. 6 shows the circuit diagram of a linear interpolator in a digital form for use in the equalizer according to FIG. 5, FIG. 7 shows the circuit diagram of a modification of the equalizing arrangement according to FIG. 5, FIG. 8 shows the circuit diagram of an equalizing arrangement according to the invention, provided with a sampler having a fixed phase and two transversal filters having variable coefficients for equalization, FIG. 9 shows the circuit diagram of a preferred embodiment of the equalizing arrangement according to FIG. 8, FIG. 10 shows the mean-square error as a function of the number of transmitted symbols during equalization of a transmission channel by a known equalizing arrangement and by an equalizing arrangement according to the invention, FIG. 11 shows the inpulse response of a certain transmission channel, FIG. 12 shows in the transmission channel according to FIG. 11 the mean-square error as a function of the number of coefficients used in a known equalizing arrangement and in an equalizing arrangement according to the invention, FIG. 13 shows the circuit diagram of an equalizing arrangement according to the invention, provided with a sampler having a fixed phase and four transversal filters having variable coefficients for the equalization, FIG. 14 shows the circuit diagram of a modification of the equalizing arrangement according to FIG. 13, FIG. 15 shows the circuit diagram of an equalizing arrangement of the recursive type according to the invention, FIG. 16 shows the inpulse response of a transmission channel exhibiting both distortions and echo phenomena, FIG. 17 shows the circuit diagram of a preferred embodiment of the equalizing arrangement according to FIG. 15.

In FIG. 1 a source 1 present in the transmitter applies data signals having a data clock frequency 1/T to a transmission channel 2 which comprises modulators and associated transmission filters, the actual transmission path and demodulators and associated receiver filters. The received data signal exhibiting amplitude and phase distortions varying with time and predominantly caused by the transmission channel 2 appears in the base-band at the output of the transmission channel 2 which is equivalent to a lowpass filter (see, for example, the Article by Niessen and Willim).

A sampler 3 samples the data signal at the output of the transmission channel 2 at the frequency of a local clock pulse generator 4 which is synchronized in known manner with the data clock frequency in the transmitter. A decision circuit 5 serves to restore the data signals by selecting, of the levels at which the data signals are transmitted, the one closest to the amplitude of the samples of the received data signal. Since the distortions caused by the transmission channel 2 may produce intersymbol interferences which may lead to an unacceptable error rate in the restored data signal, an equalizing arrangement is provided between the sampler 3 and the decision circuit 5, which arrangement must automatically realize a transfer function which is inverse relative to that of the lowpass filter equivalent to the transmission channel 2.

In FIG. 1 the equalizing arrangement is of the nonrecursive type and includes a transfersal filter 6 whose necessarily duration-limited impulse response must be automatically controlled for correcting the distortions caused by the transmission channel 2. The transversal filter 6 may be of the analog or digital type. In the latter case, shown in FIG. 1, the numbers applied to the input of the transversal filter 6 are obtained by coding the samples of the data signal with the aid of an analog-to-digital converter 7 such as a PCM coding circuit.

To simplify the terminology the numbers at input and output of the transversal filter 6 are referred to as samples, assuming that these samples are coded when the transversal filter is of the digital type. The samples occurring at the input of the transversal filter 6 are applied to a cascade arrangement of 2N delay circuits R each introducing a delay T which corresponds to the frequency 1/T of the sampling and wherein N is an integer greater than one. The total delay 2NT determines the total duration of the impulse response used for equalization. The input and output terminals of the delay circuits R are connected by means of 2N + 1 taps S to a first input of 2N + 1 multipliers P whose second input is connected to one of 2N + 1 memory elements m in which the coefficients of the transversal filter are stored. The output of each multiplier P is connected to one of the inputs of a summing circuit 8. The transversal filter 6 is controlled in such a manner that samples of the frequency 1/T occur at the output of the summing circuit 8, which samples are represent the weighted sum of the 2N + 1 samples at the taps S of the cascade arrangement of the delay circuits R, while the coefficients used for weighting are stored in the memories *m*. The values of these coefficients are adjusted with the aid of a coefficient adjusting arrangement 11 which forms part of a control loop 9 to which an error signal provided by a difference producer 10 is applied. This difference producer is connected between input and output of the decision circuit 5. The adjusting arrangement 11 comprises 2N + 1 adjusting circuits C each generating an adjusting signal for each of the coefficients in the memories m so as to minimize a predetermined function of error signal.

The mean-square error is generally used for this function. For this case the operation of the equalizing arrangement whose structure has been given above will now be described in greater detail.

The reference $\theta i$ denotes the symbols which are transmitted by the data source 1 in the transmitter with time intervals T. The transmitted data signal may be represented by:

$$E(t)=\sum_{-\infty}^{+\infty}\theta i\cdot\delta(t-iT)$$

in which $\delta$ is the Dirac-function.

The received data signal $x(t)$ applied to the input of the sampler 3 can be written as:

$$x(t)=\sum_{-\infty}^{+\infty}\theta i\cdot h(t-iT)$$

The distortions of this received data signal are characterized by the impulse response $h(t)$ of the lowpass filter which is equivalent to the transmission channel 2. For a single transmitted symbol $\theta i$ the signal received has the shape of the impulse response $h(t)$ whose shape is shown by way of example in FIG. 2.

Figure 2:
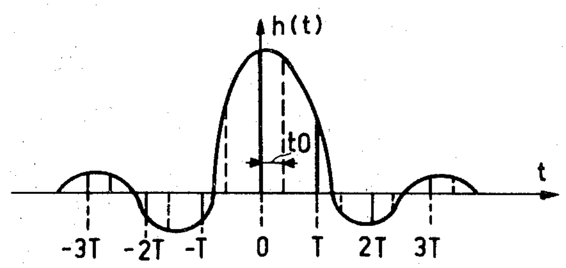
FIG. 2 shows the shape of the impulse response of a transmission channel.

The signal $x(t)$ is sampled in time intervals T in the sampler 3 with a fixed phase which is generally such that the reference instant of the sampling instants coincides with the instant $t = 0$ when the impulse response is at a maximum. FIG. 2 shows for this case in solid lines the samples of $h(t)$ corresponding to a single transmitted symbol $\theta i$.

When assuming that the sample $x(iT)$ corresponding to a symbol $\theta i$ is present in the middle of the cascade of the 2N delay circuits R of the transversal filter 6, the corresponding sample $y(iT)$ at the output of the transversal filter can be written as:

$$y(iT) = \sum_{k=-N}^{+N} a_k \cdot x[(i-k)T] \quad (1)$$

In this expression in which K comprises all integers of from $-N$ to $+N$, $a_k$ represents the $2N = 1$ coefficients stored in the memories $m$;

$x[(i-k)T]$ represents the $2N + 1$ samples which are available at the taps $S$ of the transversal filter.

The decision circuit 5 quantizes each sample $y(iT)$ by selecting among the data symbols of the data the one whose level is closest to that of $y(iT)$. If the symbol supplied by the decision circuit 5 differs from the desired symbol $\theta i$, a symbol error occurs. This error occurs when the error signal $e(iT)$ is too large, when $e(iT)$ is determined by the following relation:

$$e(iT) = y(iT) - \theta i$$

Generally the coefficients $a_k$ of the transversal filter 6 in the conventional equalizers are adjusted with the aid of the control loop 9 in such a manner that the mean-square error $f$ is minimized, where $f$ is given by:

$$f = E\ [e(iT)]\ ^256 = E\ [y(iT) - \theta i]\ ^2 \quad (3)$$

In this formula E indicates that the mean value of the magnitude between braces must be formed.

By substitution of formula (1) for $y(iT)$ in formula (3) the mean-square error is obtained as a function of the coefficients $a_k$, hence $f = f(a_k)$.

To determine the values of the coefficients $a_k$ for obtaining a minimum value $f_{min}$ of the mean-square error a system of 2N + 1 equations with 2N + 1 unknown balues $a_k$ must be solved:

$$\delta f(a_k)/\delta a_k = 0 \quad (4)$$

in which the integer $k$ comprises all values of from $-$N to +N.

In practice the adjustment of the coefficients $a_k$ is performed in an iterative manner using the steepest descent algorithm in which the coefficients thus obtained converge to the solution of the system of equations (4). The description and elaboration of this algorithm are given in the first and second Articles of the above-mentioned Articles. The steepest descent algorithm is defined by the following relation:

$$a_k^{j+1} = a_k^j - \alpha[\delta f(a_k)/\delta a_k]^j \quad (5)$$

where $k$ varies between $-$N and +N.

According to this formula the coefficients $a_k$ are obtained at the iteration step $j$ for the following iteration step $j + 1$ modified by an amount $$-\alpha[\delta f(a_k)/\delta a_k]$$

calculated for the iteration step $j$ where $\alpha$ is a constant coefficient.

While using the formulas (1), (2) and (3) and after elaboration of the calculation the steepest descent algorithm (5) is written as:

$$a_k^{j+1} = a_k^j - \Delta \cdot E\ e^j(iT) \cdot x\ [(i-k)T] \quad (6)$$

In this formula $\Delta = 2\alpha$ is a coefficient determining the step size of the algorithm.

FIG. 1 diagrammatically shows the circuits required for realizing the algorithm according to formula (6) in the control loop 9.

The difference producer 10 connected between input and output of the decision circuit 5 provides the error signal $e(iT)$ in accordance with formula (2) at iteration step j. This error signal is applied to the adjusting arrangement 11 with 2N + 1 identical circuits C each determining the adjustment of a coefficient $a_k$ of the transversal filter 6. In each adjusting circuit C the sample $x[(i-k)T]$ at the tap $S_k$ of the transversal filter corresponding to the coefficient $a_k$ and the error signal $e(iT)$ is applied to a multiplier 12 producing the product $e(iT) \cdot x[(i-k)T]$ An integrating network 13 connected to the output of multiplier 12 supplies the mean value of this product. This mean value is multiplied by the coefficient $\Delta$ in a multiplier 14 which thus applies the amount by which according to formula (6) the coefficient $a_k$ will be modified for the next iteration step $j + 1$ to the memory $m_k$. The iteration period may be equal to the period T of the data clock frequency; the coefficients are then modified at each received data symbol. The iteration period may likewise be equal to a multiple $q$T of this periode T; in that case the result of $q$ modifications to be performed on the coefficients is integrated before actual modifications are performed.

Dependent on the characteristics of the amplitude and delay distortions caused by the transmission channels, i.e. dependent on the shape of their impulse response, the results obtained with a non-recursive equalizing arrangement of this type are very different. A large number of experiments performed by the Applicant have shown that, for example, certain transmission channels are poorly equalized.

FIG. 3$a$ shows by way of example the impulse response $h(t)$ of such a transmission channel with the time axis divided in periods T of the data clock frequency. This pulse imresponse $h$(T) corresponds to the received analog signal when applying a single Dirac-pulse to the input of the transmission channel. The quality of equalization can be simply judged in practice by determining the mean-square error f defined by the relations (2) and (3) when a series of Dirac-pulses with two randomly occurring levels is applied to the input of the transmission channel.

FIG. 3b shows the impulse response $h(t)$ of FIG. 3a sampled with the frequency 1/T by the sampler 3 at a sampling phase of zero, which means that the instant $t = 0$ at which $h(t)$ assumes its maximum value is taken as a reference instant of the sampling instants. Then there are two samples, one with a value 1 at the instant $t = 0$ and another with the value −0.9 at the instant $t = -T$.

It will be evident that for this impulse response inadmissible interference occur at the sampling instants at the receiver end between two successively transmitted pulses. If no equalizing arrangement is used the mean-square error is 0.81.

FIG. 3c shows the equalized impulse response at the input of the decision circuit 5 when using the equalizing arrangement hitherto described with a transversal filter having 6 adjustable coefficients and with a sampling phase of zero. Whereas only one sample of the value 1 should occur at the instant $t=0$, several samples whose values are not negligible occor on either side of a sample having a lower value than 1 at the instant $t=0$. This equalization of rather poor quality is characterized by a mean-square error of 0.1.

The invention makes it possible to obviate results of this nature and provides in a general manner a simple directive for obtaining a considerable improvement in the quality of equalitzation without an increase of the number of adjustable coefficients in the equalizing arrangement.

According to the invention the equalizing arrangement includes means for varying the phase of the sampling instants. In the embodiment shown in FIG. 1 direct means are used which consist of a phase shifting circuit 15 connected to the output of the local clock pulse generator 4 of the frequency 1/T. According to the variable signal applied to a control input 16 of the phase shifting circuit 15 the phase of the sampling instants in the sampler 3 is varied. This phase of the sampling instants is adjusted with the aid of a phase adjusting arrangement 18 in a control loop 17 to which the error signal supplied by the difference producer 10 is applied so as to minimize a predetermined function of the error signal (the mean-square error).

Likewise as the first control loop 9 the second control loop 17 is designed to minimize the mean-square error. In the equalizing arrangement according to the invention the sampling phase is thus an extra variable which together with the coefficients $a_k$ of the transversal filter 6 is utilized to minimize the mean-square error. With this extra variable being taken into account, the above-mentioned relations are re-written whereafter the structure of the phase adjusting arrangement 18 of the second control loop 17 will be given.

As FIG. 2 shows, the variable sampling phase is characterized by the time interval $to < T$ between samples having a variable sampling phase (shown in broken lines) and samples having a fixed sampling phase (shown in solid lines). The values of the samples available at the taps S of the transversal filter 6 thus depend on $to$ and particularly the sample at the central tap is written as: $x(to + iT)$. The corresponding sample obtained at the output of the transversal filter 6 is written in a manner comparable to formula (1) as:

$$y(to+iT) = \sum_{k=-N}^{+N} a_k \cdot x[to+(i-k)T] \quad (7)$$

The mean-square error is written as:

$$f = E\{y(to+iT) - \theta i\}^2 \quad (8)$$

By substitution in formula (8) of the value of $y(to+iT)$ according to formula (7), a value $f$ is obtained which depends on $a_k$ and $to$, hence $f = f(a_k, to)$. To minimize the mean-square error the steepest descent algorithm is used, likewise as in the foregoing, instead of determining the values of $a_k$ and $to$ as a solution of the system of equations:

$$\left\{ \begin{array}{l} \delta f(a_k, to)/\delta a_k = 0 \\ \\ \delta f(a_k, to)/\delta to = 0 \end{array} \right\} \quad (9)$$

in which $k$ varies from −N to +N. This algorithm is expressed by two iteration relations one of which relates to the adjustment of the coefficients $a_k$ and the other to the adjustment of $to$.

$$a_k^{j+1}\ 1\ a_k^j - \alpha[\delta f(a_k, to)/\delta \cdot a_k] \quad (10)$$

$$to^{j+1} = to^j - \alpha[\delta f(a_k, to)/\delta to] \quad (11)$$

in which $\alpha$ indicates the constant coefficient.

By using the formulas (7) and (8) and by performing all calculations the formulas (10) and (11) can be written as:

$$a_k^{j+1} = a_k^j - \Delta \cdot E\ \{e^j(iT) \cdot x\ [to^j + (i-k)\ T]\ \} \quad (12)$$

$$to^{j+1} = to^j - \Delta \cdot E\left\{e^j(iT) \cdot \sum_{k=-N}^{+N} a_k^j \cdot \dot{x}[to^j + (i-k)T]\right\} \quad (13)$$

In these formulas $\Delta = 2\ \alpha$ and $\dot{x}(t)$ is the derivative of $x(t)$ with respect to time, whilst $k$ is an integer and varies from −N to +N.

The formula (12) indicates the modifications which must be used for each iteration step in the coefficients $a_k$ of the transversal filter 6. This formula is altogether comparable to formula (6) which determines the structure of the coefficient adjusting circuits C in the adjusting arrangement 11 in which the only difference is that the value of the samples present at the taps S of the transversal filter 6 now depends on $to$. The first control loop 9 for the adjustment of the coefficients thus has the same structure and acts in the same manner as described in the foregoing.

Formula (13) indicates the modifications to be used for each iteration step in the time interval to characterizing the phase of the sampling instants. The adjusting arrangement 18 comprises the circuits required for realizing the modifications in $to$ according to formula (13). The adjusting arrangement 18 includes the adjusting circuit 19 having the same elements as an adjusting circuit C for the adjustment of a coefficient of the transversal filter 6. The adjusting circuit 19 firstly includes a multiplier 20 an input of which receives the error signal $e(iT)$ from difference producer 10 and another input of which receives the output samples of a transversal filter 6' which is identical to the transversal filter 6, so that this transversal filter likewise includes 2N delay circuits R' with a delay T and 2N + 1 multipliers P' receiving the same coeffcients $a_k$ from the memories $m$ in transversal filter 6 as the multipliers P and whose outputs are connected to a summing circuit 8'. Samples coded by an analog-to-digital converter 7' and supplied by a sampler 3', which is operated in synchronism with the sampler 3 by the output pulses from the phase shifting circuit 15, are applied to the input of transversal filter 6'. The analog signal $x(t)$ at the input of the sampler 3' is supplied by a differentiating network 23 to which the signal $x(t)$ is applied which is obtained at the output of the transmissions channel 2. It will be evident that the transversal filter 6' supplies samples each being the result of the weighted sum occurring in formula (13) and that the term between braces in formula (13) is obtained at the output of the multiplier 20. The mean value of this term is supplied by the integrating network 21 connected to multiplier 20 and a multiplier 22 multiplies this mean value by the coefficient Δ. Hence the modification term of *to* as occurring in formula (13) is obtained at the output of the multiplier 22. The phase of the control pulses for the samplers 3 and 3' is thus modified in accordance with an iterative procedure.

Since the sampler 3' and the sampler 3 are synchronously controlled and since the transversal filter 6' has the same structure and uses the same coefficients as the transversal filter 6', it may be advantageous to use only one sampler and only one transversal filter by allocating the times of operation of these elements alternately to the adjustment of the coefficients $a_k$ and the adjustment of *to*.

Since the transversal filter 6' has the same structure and uses the same coefficients as the transversal filter 6, it may be advantageous to use only one transversal filter which by time allocation is alternately used as transversal filter 6 for the adjustment of the coefficients $a_k$ and as transversal filter 60' for the adjustment of *to*.

FIG. 4 diagrammatically shows an embodiment of such an equalizing arrangement in which within one period T the time is divided in two half periods T/2 which are utilized for the adjustment of $a_k$ and *to*, respectively. The elements shown in FIG. 1 have the same reference numerals in this Figure.

The sampler 3 connected to the input of a transversal filter 24 is controlled by the frequency 2/T, derived from the clock pulse generator 4 with the aid of a frequency doubler 25 and with a phase which is variable by the phase shifting circuit 15. Either the output signal $x(t)$ of the transmission channel 2 delayed a time T/2 by a delay circuit 27 or the output signal $x(t)$ of the differentiating network 23 is applied to the input of the sampler 3 by means of a commutator 26 in the form of a change-over switch having two positions $h_1$ and $b_1$. The commutator is set to these two positions $h_1$ and $b_1$ by the signals at the two outputs H and B of a modulo-2-counter 28 which counts the pulses with the frequency 2/T at the output of the phase shifting circuit 15. Each position is thus retained for the time T/2.

The transversal filter 24 includes a cascade arrangement of delay circuits $R_1$ with a delay of T/2, whose number is set to 4N so as to simplify the comparison with the equalizing arrangement according to FIG. 1. These delay circuits have 2N + 1 taps S*i* separated by two delay circuits $R_1$ and connected in the manner as shown in FIG. 1 to multipliers P and to adjusting circuits C for adjusting the coefficients stored in the memories $m$. The output of the 2N + 1 multipliers P is connected to the summing circuit 8 which supplies samples to the output of the transversal filter at the same frequency 2/T as that of the input samples which is diagrammatically shown in FIG. 4 the connection of the output of the phase shifting circuit 15 to a control terminal 45 of the summing circuit 8. The delay circuits $R_1$ likewise have 2N taps S*p* separated from the taps Si by a delay circuit. These taps S*p*, which are not used, only serve to explain the operation of the equalizing arrangement.

A commutator 29 in the form of a change-over switch having two positions $h_2$ and $b_2$ is connected to the output of the transversal filter 24 and applies the output samples of the transversal filter 24 either to the decision circuit 5 or to an input of the multiplier 20 forming part of the phase adjusting circuit 19. The commutator 29 is synchronously controlled with the commutator 26 by the signals at the outputs H and B of the modulo-2-counter 28.

The error signal at the output of the difference producer 10 is applied in the first control loop 9 to the coefficient adjusting arrangement 11. This arrangement includes coefficient adjusting circuits C connected to the associated memories $m$ through delay circuits r having a predetermined delay between T/2 and T. On the other hand the error signal is applied in the second control loop 17 through a delay circuit 46 having a delay of T/2 to the second input of the multiplier 20 which forms part of the phase adjusting circuit 19.

The equalizing arrangement according to FIG. 4 operates as follows. The commutators 26 and 29 are in the positions $h_1$ and $h_2$ during the half periods T/2, which for the purpose of distinction are referred to as odd, and in the positions $b_1$ and $b_2$ during the even half periods. It will be evident that the sampler 3 alternately applies samples of $x(t)$ to the input of the transversal filter 24 during the odd half periods and samples of $x(t)$ during the even half periods. Due to a delay circuit 27 having a delay of T/2 two successive samples of $x(t)$ and $x(t)$ separated by a time interval of T/2 actually correspond to one and the same sampling instant. During the odd half periods the samples of, for example, $x(t)$ appear which are separated a time interval T at the utilized 2N + 1 taps S*i* of the transversal filter while the samples of $x(t)$ appear at the taps S*p* which are not utilized. During the even half periods the samples of $x(t)$ appear at the utilized taps S*i* while the samples of $x(t)$ appear at the taps S*p*.

During the odd half periods each of the output samples of the transversal filter 24 is the result of the weighted sum of the samples of $x(t)$ and these output samples occur at the frequency 1/T. In the position $h_2$ of commutator 29 these output samples are applied to the decision circuit 5 while the error signal generated by the difference producer 10 is applied in the first control loop 9 to the coefficient adjusting arrangement 11.

The coefficient adjusting signals produced in a given odd half period by the adjusting circuits C are not directly applied to the coefficient memories $m$ but are stored for a certain time between T/2 and T in the delay circuits r so as to realize that the coefficients present in the memories m are not modified until the next even half period after the modification of to has already been performed.

During the even half periods each of the output samples of the transversal filter 24 is the result of the weighted sum of the samples of $x(t)$ and these output samples likewise occur with the period T. The weighting coefficients used in a certain even half period are the same, due to the delay circuits $r$, as those which are used in the previous odd half period for producing the coefficient adjusting signal. In the position $b_2$ of commutator 29 these output samples are applied to an input of the multiplier 20 in the phase adjusting circuit 19. The error signal originating from the difference producer 10 is applied to the other input of this multiplier 20 with a delay of T/2 brought about by a delay circuit 46, which error signal thus is the error signal used at the previous odd half period for producing the coefficient adjusting signal. In the same way as in FIG. 1 the adjusting circuit 19 produces the phase adjusting signal which is applied to the control terminal 16 of the phase shifting circuit 15. At that instant the coefficient adjusting signal is applied by the delay circuits r to the memories m so that both the modification of the coefficients $a_k$ and the modification of the sampling phase *to* is brought about during a period T in accordance with the steepest descent algorithm defined by the formulas (12) and (13).

All experiments performed by the Applicant have proved that when the sampling phase is also used in this manner for the automatic equalization of a transmission channel a quite considerable improvement in the equalization quality is obtained. For example, when using an equalizing arrangement of the type shown in FIG. 1 or 4 with 6 adjustable coefficients and with an adjustable sampling phase for the equalization of the transmission channel whose impulse response is shown in FIG. 3*a*, the equalized impulse response according to FIG. 3*d* is obtained at the input of the decision circuit 5. This equalized impulse response which must be compared with the impulse response according to FIG. 3*c*, also obtained when using a known equalizing arrangement with six adjustable coefficients includes in addition to the sample with a maximum value which is substantially equal to 1 only adjacent samples which can hardly be shown on the scale used in FIG. 3 and which have a value substantially equal to zero. The corresponding mean-square error is $3.10^{-5}$ while the sampling phase, which is equal to 0 prior to equalization, has adjusted at a value *to* of 0.17 T. This example clearly shows the importance of the sampling phase as a parameter for the equalization quality.

In this first embodiment of the equalizing arrangement according to the invention described with reference to FIGS. 1 and 4 the phase of the control pulses from the sampler 3 is directly influenced in order to obtain samples $x\ [\,to + i\mathrm{T}]$ at the input of the transversal filter and hence samples $x\ [to + (i-k)\mathrm{T}]$ at the different taps of the transversal filter. The phase of these samples characterized by the time interval *to* constitutes one of the variables which together with the coefficients are adjusted so as to minimize the mean-square error. This direct control system for the phase of the samples in the transversal filter is not the only usable control system and in addition it is not always the most advantageous system.

This system requires a pulse phase shifting circuit 15 of great accuracy and sensitivity which is difficult to realize. On the other hand it has been found that certain impulse responses of the transmission channel give rise to samples having a value very sensitive to the parameter *to* and that, in this case, it is difficult to select the coefficient Δ of formula (13) determining the size of the iteration step to modify *to*. If Δ is too large convergence of the algorithm may occur during a given number of iteration steps while yet divergence occurs subsequently. If Δ is chosen to be too low the convergence time increases and hence the equalization rate decreases. In addition it has been found in certain cases that dependent on the initial values of the coefficients $a_k$ and the parameter *to* the equalizing arrangement can adjust at different conditions corresponding to different values of the mean-square error. Certain conditions correspond to false minimum values of the mean-square error while only one condition, namely the desired one, corresponds to the "minimum minimorum" of this error.

In the different embodiments of the equalizing arrangement according to the invention to be described hereinafter a sampler having a fixed phase is used at the output of the transmission channel which thus supplies samples of the form $x(i\mathrm{T})$. These samples are processed using one or more variable parameters which are related to the time *to* characterizing the sampling phase. By variation of this (these) parameter(s) a sampler having a variable sampling phase is imitated.

In an embodiment of the equalizing arrangement according to the invention whose circuit diagram is shown in FIG. 5, sample having a variable phase are obtained at the input of the transversal filter by performing a linear interpolation between the samples having a fixed phase of the signal $x(t)$ at the output of the transmission channel and other samples having a fixed phase of an interpolation signal derived from $x(t)$, while for obtaining the interpolated samples a parameter $\phi_o$ related to *to* is used.

The elements shown in FIG. 1 have the same reference numerals in the equalizing arrangement of FIG. 5. In this equalizing arrangement the analog signal $x(t)$ at the output of the transmission channel 2 is applied to two branches 30 and 31. The branch 30 includes the sampler 3 having a fixed phase which is directly controlled by pulses of the frequency 1/T from the local clock generator 4 and whose output is connected to one input of an adder 32. The branch 31 includes a circuit 33 which in one given embodiment may be a differentiating network and in another embodiment a delay circuit having, for example, a delay of T/2. The analog signal at the output of the circuit 33, in this case referred to as the interpolation signal, is sampled in the sampler 3′ having a fixed phase which is synchronously controlled with the sampler 3. The samples originating from sampler 3′ are multiplied by the variable parameter $\phi_o$ in a multiplier 34 whose output is connected to the other input of the adder 32. It stands to reason that the samples at the outputs of the samplers 3 and 3′ are coded by the analog-to-digital converters (not shown) if the samples are digitally processed at a later stage.

The output of the adder 32 is connected to the transversal filter 6 which comprises the same elements as those in FIG. 1 and in which the coefficients are adjusted in the same manner by the error signal which is supplied by the difference producer 10 and is applied to the first control loop 9 including the coefficient adjusting arrangement 11. The error signal is also applied to the second control loop 17 including the adjusting arrangement 18 which is provided with the adjusting circuit 19 for the adjustment of the variable parameter $\phi_o$ applied to one of the inputs of the multiplier 34.

As will be described hereinafter, the two branches 30 and 31 connected to the adder 32 make it possible to imitate the operation of a sampler having a variable phase as if the samples at the output of adder 32 have the form $x(to + iT)$ while the variations of the time interval $to$ are obtained by variation of the parameter $\phi_o$ applied to an input of multiplier 34.

The embodiment in which the circuit 33 is a differentiating network corresponds to the elaboration of a linear interpolation defined by the relation:

$$x(to + iT) \approx x(iT)\ \phi_o x(iT) \qquad (14)$$

In this formula $x(iT)$ represents the samples of the analog signal $x(t)$ at the output of the transmission channel 2; $x(iT)$ represents the samples of the interpolation signal $x(t)$ at the instant $iT$, in which $x(t)$ is derived by differentiation from $x(t)$; $\phi_o$ is a variable parameter. This formula implies that the samples $x(to + iT)$ with a variable phase $to$ can be obtained by linear interpolation between the samples $x(iT)$ and the samples $x(iT)$, namely by variation of the parameter $\phi_o$ in the interpolation formula.

FIG. 5 shows that the sampler 3 supplies the samples $x(iT)$ of the signal $x(t)$ to the output of the transmission channel 2. The sampler 3' supplies the samples $x(iT)$ of the signal $x(t)$ originating from the circuit 33 operating as a differentiating network. The multiplier 34 supplies samples $\phi_o \cdot x(iT)$ and samples $x(iT) + \phi_o \cdot x(iT)$ appear at the output of the adder 32 as a result of the interpolation according to the formula (14), said latter samples corresponding to samples $x(to + iT)$.

The embodiment in which the circuit 33 is a delay circuit corresponds to the elaboration of a linear interpolation defined by the relation:

$$x(to + iT) \approx x(iT) + \phi_o \cdot x_D(iT) \qquad (15)$$

In this formula $x_D(iT)$ represents samples of a signal $x_D(t)$ at the instant $iT$, which signal is obtained by a time translation of the analog signal $x(t)$ at the output of the transmission channel 2, for example, by a delay with T/2.

With circuit 33 formed as a delay circuit with, for example, a delay of T/2, the two branches 30 and 31 connected to adder 32 bring about a linear interpolation according to formula (15) with samples $x(to + iT)$ having a variable phase $to$ being obtained at the output of adder 32 by variation of the parameter $\phi_o$ applied to an input of multiplier 34.

The same result can be obtained with the aid of purely digital means in which the use of an analog delay circuit 33 for the signal $x(t)$ is avoided. For a delay of, for example, T/2 the interpolation circuit of FIG. 6 may be used. This interpolation circuit includes a sampler 3 which samples the signal $x(t)$ at the output of the transmission channel 2 by twice the data clock frequency, hence by a frequency of 2/T which is derived with the aid of a frequency doubler 36 from the frequency 1/T of the clock pulse generator 4. The series of samples of the frequency 2/T is decomposed in two interlaced series by means of a distributor 37 in the form of a two-position change-over switch which is controlled by the signals at the outputs of a modulo-2-counter 47 counting the pulses of frequency 2/T at the output of frequency doubler 36. The distributor 37 applies to the two branches 30 and 31 two series of samples of the frequency 1/T which relative to each other are shifted over T/2. It can be assumed that in the branch 30 samples of the form $x(iT)$ occur and in the branch 31 delayed samples of the form $x(iT - T/2)$ occur. The latter samples in branch 31 are multiplied by $\phi_o$ by means of multiplier 34 while the samples $x(iT)$ in branch 30 are delayed by T/2 by means of a delay circuit 38 so that they coincide in time with those in branch 31. Thus, samples of the frequency 1/T are obtained at the output of adder 32 which samples are the result of the interpolation according to formula (15).

Samples $x(to + iT)$ whose phase $to$ can be varied by means of the parameter $\phi_o$ are thus obtained at the input of the transversal filter 6 with the aid of the one or the other interpolation circuit described.

For obtaining the equalization, for example, the meansquare error is minimized by not only always adjusting the values of the 2N + 1 coefficients $a_k$ of the transversal filter 6 but also by adjusting the phase of the samples in this transversal filter by means of the parameter $\phi_o$. In order to indicate the operations to be performed the mean-square error must be expressed as a function of the coefficients $a_k$ of the transversal filter 6 and of the parameter $\phi_o$.

If, for example, an interpolation circuit provided with a delay circuit is used, the conformity between the samples at the taps of the transversal filter 6 expressed as a function of $to$ and those expressed as a function of $\phi_o$ may be derived from formula (15):

$$x\ [to + (i-k)T] = x\ [(i-k)T\ ] + \phi_o \cdot x_D\ [(i-k)\ T] \qquad (16)$$

$$x\ [to + (i-k)T\ ] = x\ [\ (i-k)T\ ] + \phi_o \cdot x_D\ [(i-k)T]$$

The samples $y\ (to + iT)$ at the output of the transversal filter 6 are given as a function of $\phi_o$ and of $a_k$ by the formula:

$$y(to+iT) = \sum_{k=-N}^{+N} a_k \cdot \{x[(i-k)T] + \phi_o \cdot x_D[(i-k)T]\} \qquad (17)$$

The mean-square error $f$ is obtained as a funtion of $a_k$ and $\phi_o$ by substitution of the value of $y(to + iT)$ in accordance with formula (17) in formula (8).

Instead of solving the system of equations:

$$\delta f(a_k, \phi_o)/a_k = 0 \qquad (18)$$

$$\delta f(a_k, \phi_o)/\delta_o = 0$$

in which $k$ varies from −N to +N, the steepest descent algorithm is used, likwise as in the foregoing, which is expressed by the iteration relations:

$$a_k^{j+1} = a_k^{j} - \alpha\ [\delta f(a_k, \phi_o)/\delta\ a_k]^{j} \qquad (19)$$

After performing all calculations the formulas (19) and (20) may be written as follows:

$$\phi_o^{j+1} = \phi_o^j - \alpha\,[\delta f(ak,\phi_o)/\delta\phi_o]^j;$$

$$a_k^{j+1} = a_k^j - \Delta\cdot E\{e^j(iT)\cdot[x[(i-k)T] + \phi_o{}^{j}\cdot x_D[(i-k)T]]\} \quad (21)$$

$$\phi_o^{j+1} = \phi_o^j - \Delta\cdot E\left\{e^j(iT)\cdot\sum_{k=-N}^{+N} a_k^j\cdot x_D[(i-k)T]\right\} \quad (22)$$

All terms in these formulas have been defined hereinbefore.

The iteration formula (21) which must be used for the adjustment of the coefficients $a_k$ is actually exactly the same as formula (12) used for the adjustment of the coefficients of the transversal filter 6 in FIG. 1. This may be apparent from formula (16). Consequently the first control loop 9 in FIG. 5, which brings about the modifications of the coefficients $a_k$ at each iteration step, is formed in the same manner as that in FIG. 1 and this includes the same elements and operates in the same manner.

The iteration formula (22) for the adjustment of the parameter $\phi_o$ at one of the inputs of multiplier 34 may be compared with the iteration formula (13) for the adjustment of the phase *to* of the sampling instants in the equalizing arrangement of FIG. 1. These formulas differ only as regards the expression for the samples figuring in the summation. As a result the second control loop 17 bringing about the modifications of the parameter $\phi_o$ at each iteration step has a structure which is equal to that of the equalizing arrangement of FIG. 1, but the transversal filter 6′ having the same coefficients as the transversal filter 6 now receives the samples $x_D(iT)$ at the output of the sampler 3′. The adjusting signal for modifying the parameter $\phi_o$ applied to multiplier 34 is then obtained at the output of the adjusting circuit 19 to which the error signal $x(iT)$ and the samples from the transversal filter 6′ are applied.

If an interpolation circuit provided with a differentiating network 33 is used, the interpolation formula (14) yields the expression for the samples at the input of the transversal filter 6 as a function of $\phi_o$ and it will be readily evident that the circuit diagram of the equalizing arrangement is exactly the same and operates in the same manner.

It has hitherto been assumed that the linear interpolation is performed between the samples of the signal $x(t)$ itself and an interpolation signal $x_D(t)$ or $\dot{x}(t)$ derived from $x(t)$. In this case the variation range for the phase of the interpolated sample corresponds to a variation range for *to* from 0 to a certain value, for example, T/2. Likewise a linear interpolation may be performed between two interpolation signals derived from $x(t)$ which are both different from $x(t)$ for example, $x_{D1}(t) = x(t - T/4)$ and $x_{D2}(t) = x(t - T/2)$. In this case delay circuits having delays of T/4 and T/2 must be introduced into the two branches 30 and 31, respectively. The variation for *to* then ranges from T/4 to T/2. This may be advantageous if it can be insured that the final value of *to* is within this range.

A further embodiment of the equalizing arrangement which likewise use the 2N + 1 coefficients $a_k$ and the parameter $\phi_o$ so as to minimize the mean-square error is shown in FIG. 7. The structure of the equalizing arrangement according to FIG. 7 can be obtained by expressing the samples $y(to + iT)$ at the input of the decision circuit 5 in the following manner, which can easily be derived from formula (17):

$$y(to+iT) = \sum_{k=-N}^{+N} a_k\cdot x[(i-k)T] + \phi_o \sum_{k=-N}^{+N} a_k\cdot x_D[(i-1)T] \quad (23)$$

According to this formula the samples at the input of the decision circuit 5 in FIGS. 7 are obtained at the output of an adder 40 having two inputs. Samples corresponding to the first term in formula (23) are applied to one input of adder 40. These samples are obtained at the output of the transversal filter 6 with 2N + 1 variable coefficients $a_k$ to whose input the samples $x(iT)$ originating from the sampler 3 for the signal $x(t)$ are applied. Samples corresponding to the second term in formula (23) are applied to the other input of adder 40. These samples are obtained at the output of a multiplier 41 which multiplies the samples at the output of the transversal filter 6′ by the variable parameter $\phi_o$. The transversal filter 6′ has the same structure and utilizes the same coefficients $a_k$ as the transversal filter 6. The samples $x_D(iT)$ which are supplied by the sampler 3′ for the signal $x_D(t)$ at the output of the delay circuit 33 are applied to the input of this transversal filter 6′.

A comparison of the circuit diagrams of FIGS. 5 and 7 shows that in FIG. 5 weighting with the variable parameter $\phi_o$ is performed on the samples $x(iT)$ and $x_D(iT)$ originating from the samplers 3 and 3′, whereas in FIG. 7 weighting with the variable parameter $\phi_o$ is performed on the output samples of the two transversal filters 6 and 6′. The value of the samples at the input of the decision circuit 5 is the same in both cases.

In FIG. 7 the 2N + 1 coefficients $a_k$ and the weighting parameter $\phi_o$ are likewise used to minimize the mean-square error. The steepest descent algorithm is likewise defined by the iteration formulas (21) and (22). The first control loop 9 adjusting the 2N + 1 coefficient $a_k$ of the transversal filters 6 and 6′ has the same structure and is connected in the same manner as that in FIG. 5. The second control loop 17 for the adjustment of the parameter $\phi_o$ has the same structure as that in FIG. 5 and includes the adjusting circuit 19 receiving the error signal and the samples at the output of the transversal filter 6′ and producing the adjusting signal to modify the parameter $\phi_o$ which is applied to the multiplier 41 connected in FIG. 7 to the output of the transversal filter 6′.

The equalizing arrangements according to FIGS. 5 and 7 have different structures, but actually they are perfectly equivalent as regards operation and properties. In both cases the equalization is obtained by adjustment of the 2N + 1 coefficients $a_k$ of the transversal filter 6 and by adjustment of a variable interpolation parameter $\phi_o$. It is important to note that in these embodiments the coefficients of the transversal filter 6′ are maintained equal to the coefficients of the same rank of the transversal filter 6. In both cases actally (2N + 1) + 1 = 2N + 2 variables are available to minimize the mean-square-error. As compared with the embodiments according to FIGS. 1 and 4 the difficulty is avoided of realizing a phase shifting circuit for the control pulses of a sampler. It has likewise been found that also in this cases a rapid equalization can be obtained. But here, too, the difficulty remains that for certain transmission channels and for certain initial values of the variables $a_k$ and $\phi_o$ the condition of the equalizing arrangement achieved after convergence may correspond to false minima of the mean-square-error.

A further embodiment of the equalizing arrangement according to the invention to be described hereinafter makes it possible to obtain with certainty after convergence the "minimum minimorum" of the mean-square error. The basic idea of this modified embodiment consists in the increase of the number of variables which are adjusted for minimizing the mean-square error by using no longer, as in the foregoing, a single parameter $\phi_o$ and the coefficients $a_k$ of the transversal filter 6, but by using all coefficients of the transversal filter 6' instead of the parameter $\phi_o$. In this modification the coefficients of the transversal filter 6' are independent of those of the transversal filter 6 and may even be different therefrom in number.

FIG. 8 shows the circuit diagram of an equalizing arrangement according to this modification which is derived from the equalizing arrangement in FIG. 7 in conformity with the above-mentioned idea.

The equalizing arrangement of FIG. 8 includes a section A for treating the samples $x(iT)$ of the analog signal $x(t)$ at the output of the transmission channel 2 and a section B for treating the samples $x_D(iT)$ $x(iT)$ of the interpolation signal at the output of the circuit 33. It is hereinafter assumed that samples $x_D(iT)$ are concerned. Apart from the number of elements the same sections A and B have the same structure. The elements of the two sections have the same reference numerals as those hitherto used but with the addition of the indices A and B.

In the section A the transversal filter 6A with 2N + 1 coefficient $a_k$ is included after the sampler 3A having a fixed phase. In the section B the transversal filter 6B with 2M + 1 coefficients $b_1$ (wherein M is an integer greater than 1 ) is included after the sampler 3B having a fixed phase. The outputs of the two transversal filters are directly connected to the two inputs of a summing circuit 40 whose output applies the samples likewise indicated by $y(to + iT)$ to the input of the decision circuit 5.

The value of these samples now depends on the coefficients $a_k$ of the transversal filter $6_A$ and on the coefficients $b_1$ of the transversal filter $6_B$ according to the following formula:

$$y(to+iT)=\sum_{k=-N}^{+N} a_k \cdot x[(i-k)T]+\sum_{1=-M}^{+M} b_1 \cdot x_D[(-1)T] \quad (24)$$

The interpolation with variable weighting between the samples at the output of the transversal filter $6_A$ and the samples at the output of the transversal filter $6_A$ and the samples at the output of the transversal filter $6_B$ is now effected by means of the 2M + 1 variable coefficients of the transversal filter $6_B$.

By substitution of the expression for $y(to + iT)$ according to formula (24) in the expression for the mean-square error: $f = E\{[y(to + iT) - \theta]^2\}$a value of $f$ is obtained as a function of 2N + 1 variables $a_k$ and of 2M + 1 variables $b_1$, hence $f = f(a_k, b_1)$.

The steepest descent algorithm also to be used in this case for supplying those values of the variables minimizing the mean-square error is then defined by the two iteration relations:

$$a_k^{j+1} = a_k^j - \alpha\,[\delta f(a_k, b_1)/\delta a_k]^j \quad (25)$$

where $k$ varies from −N to +N, and:

$$b_1^{j+1} = b_1^j - \alpha[\delta f(a_k, b_1)/\delta b_1]^j \quad (26)$$

where 1 varies from −M to +M.

After elaboration of all calculations the iteration formulas (25) and (26) are written as:

$$a_k^{j+1} = a_k^j - \Delta \cdot E \quad e^j(iT) \cdot x\,[(i-k)T] \quad (27)$$

in which $k$ varies from −N to +N, and:

$$b_1^{j+1} = b_1^j - \Delta \cdot E \quad e^j(iT) \cdot x_D\,[(i-1)T] \quad (28)$$

in which 1 varies from −M to +M.

The realization of the iteration formula (27) for the adjustment of the 2N + 1 coefficients $a_k$ of the transversal filter $6_A$ is effected in FIG. 8 with the aid of the control loop $9_A$ which is connected in the same manner, comprises the same elements and operates in the same manner as the first control loop 9 used in the previous equalizing arrangements for the adjustment of the coefficients of the transversal filter 6.

The realization of the iteration formula (28) for the adjustment of the 2M + 1 coefficients $b_1$ of the transversal filter $6_B$ is effected in FIG. 8 with the aid of the control loop $9_B$ which with respect to the transversal filter $6_B$ is connected and operates in the same manner as the control loop $9_A$ for the transversal filter $6_A$. The adjusting arrangement $11_B$ of this control loop $9_B$ comprises of course 2M + 1 adjusting circuits $C_B$ for the separate adjustment of the coefficients $b_1$.

It can be mathematically proved and it has been verified experimentally that whatever the initial values of the coefficients $a_k$ and $b_1$ the "minimum minimorum" of the mean-square error is always obtained.

It is to be noted that the equalizing arrangement according to FIG. 8 the known equalizing arrangement with a single transversal filter, because to obtain the latter it is sufficient to ensure that the sampler $3_B$ does not operate. The equalizing arrangement of FIG. 8 likewise includes the previously described equalizing arrangements utilizing a linear interpolator with a variable parameter $\phi_o$ because to obtain the latter it is sufficient to ensure that the coefficients of the transversal filter $6_B$ are proportional to the coefficients of the transversal filter $6_A$ with a proportionality factor equal to $\phi_o$. Thus the equalizing arrangement of FIG. 8 can only yield better results than any of the two equalizing arrangements comprised therein.

It will be evident that in the equalizing arrangement in FIG. 8 the summing circuits $8_A$, $8_B$ and 40 can be combined to form a single summing circuit having 2N + 1 inputs connected to the multipliers $P_A$ of the section A and 2M + 1 inputs connected to the multipliers $P_B$ of the section B and having an output connected to the input of the decision circuit 5.

The equalizing arrangement according to FIG. 8 may be constructed in different ways, which, however, from the viewpoint of operation and properties are equivalent, particularly when the circuit 33 is a delay circuit.

FIG. 9 shows by way of example an embodiment which is equivalent to the equalizing arrangement of FIG. 8 which is provided with a delay circuit 33 having a delay of T/2 and uses the same number of 2N + 1 coefficients $a_k$ and $b_l$ in the sections A and B.

The equalizing arrangement of FIG. 9 includes a sampler 3 which samples the signal $x(t)$ at the output of the transmission channel 2 with a fixed phase and a frequency 2/T which is derived from the frequency 1/T of the clock pulse generator 4 with the aid of a frequency doubler 50. The samples of this frequency are applied in a transversal filter 51 to a cascade arrangement of 4N + 1 delay circuits $R_1$ each having a delay of T/2. This number of delay circuits is, however, chosen to easily prove the equivalence of the equalizing arrangements in FIG. 8 and FIG. 9. Actually, this number need not be a multiple of 4 supplemented by 1 and it may be arbitrarily chosen. The samples available at the 4N + 2 taps of this transversal filter 51 are applied to multipliers for multiplication by coefficients, while the outputs of the multipliers are connected to the inputs of a summing circuit 52. It will be readily evident that samples $x(iT)$ of the signal $x(t)$ are available at 2N + 1 taps $S_A$, always separated by two delay circuits $R_1$, so that samples $x(iT - T/2)$ are available at the 2N + 1 taps $S_B$, separated from the taps $S_A$ by one delay circuit $R_1$. Thus it can be stated that the transversal filter 51 is divided in two sections: one section A includes the elements connected to the taps $S_A$ and treats the samples $x(iT)$ and is thus equivalent to the transversal filter $6_A$ in FIG. 8; a second section B includes the elements connected to the taps $S_B$ and treats the samples $x(iT - T/2)$ and is thus equivalent to the transversal filter $6_B$ in FIG. 8. In order to obtain an equivalence between the transversal filter 51 and the combination of the two transversal filters $6_A$ and $6_B$ it is also necessary that the samples at the output of the transversal filter 51 are supplied with the frequency 1/T. In FIG. 9 the pulses of the frequency 1/T from clock pulse generator 4 are applied to a control terminal 53 of the summing circuit 52 so as to realize that samples of the frequency 1/T are actually obtained at the output of the summing circuit 52.

Actually, the elements of the two sections A and B in the transversal filter 51 are not different and they are connected in the same manner. Particularly, the coefficients $a_k$ and $b_l$ stored in the memories are simultaneously adjusted to minimize the mean-squzre error with the aid of a control loop 54 including an adjusting arrangement 55 provided with adjusting circuits $C_A$ and $C_B$ each adjusting a coefficient of the transversal filter 51. It can be stated that this control loop 54 comprises the two control loops $9_A$ and $9_B$ of the equalizing arrangement of FIG. 8.

It is to be noted that the embodiment of the equalizing arrangement according to the invention shown in FIG. 9 has a structure which at first sight is analogous to that of a known equalizing arrangement utilizing the coefficients of the transversal filter for minimizing the mean-square error. Actually, the difference is very large and this difference is based on the frequency with which the sampling is performed by the sampler 3 and on the delay of the delay circuits $R_1$. In this known equalizing arrangement the sampling frequency would be 1/T instead of 2/T, while the delay of the delay circuits $R_1$ would then be T instead of T/2. Results of experiments will be described hereinafter by way of example which show the considerable improvement achieved by the equalizing arrangement according to the invention, particularly for the embodiment shown in FIG. 9.

If for the equalization of a transmission channel whose impulse response is shown in FIG. 3*a* an equalizing arrangement according to FIG. 9 is used which totals 6 coefficients and is equivalent to that of FIG. 8, and which includes 3 coefficients in section A and 3 coefficients in section B, it is found that in the absence of noise introduced by the transmission channel and in case of data signals having two levels the mean-square error after equalization is less than $10^{-7}$. The results already mentioned hereinbefore are also to be noted, which results have been achieved with a known equalizing arrangement likewise having six coefficients ($f = 0.1$) and an equalizing arrangement of the type shown in FIG. 1 ($f = 3.10^{-5}$).

FIG. 10 shows the mean-square error $f$ as a function of the number q of transmitted symbols, namely likewise for the transmission channel with the impulse response according to FIG. 3*a* for a two-level data signal, but here in the presence of noise corresponding to a signal-to-noise ratio of 23 dB. In this Figure the horizontal straight line B corresponds to the noise. The broken-line curve represents $f$ as a function of $q$ for a known equalizing arrangement including a transversal filter with nine coefficients. The minium value of $f$ at a sufficiently large $q$ is $8.10^{-2}$. The solid-line curve corresponds to an equalizing arrangement according to FIG. 8 including a delay circuit 33 (delay T/2) and also totalling 9 coefficients, namely 4 coefficients in section A and 5 coefficients in section B. The minimum value of $f$ is 2, $9.10^{-3}$. FIG. 10 shows that as compared with the known equalizing arrangement a considerably better equalization can be obtained with the equalizing arrangement according to the invention and that the noise level can be substantially reached. In addition it is found that the convergence time is considerably shorter.

FIG. 11 shows the impulse response of a transmission channel to be equalized in which the time axis is divided in periods F of the transmitted data signal.

FIG. 12 shows the minimum mean-square error $f_{min}$ obtained after equalization as a function of the number N of the coefficients for 8-level data signals in the presence of noise with a signal-to-noise ratio of 23 dB. The noise level is shown by the horizontal straight line B'. The broken-line curve relates to a known equalizing arrangement including a transversal filter with N coefficients to whose input samples of the output signal of the transmission channel are applied at the frequency 1/T. The solid-line curve relates to an equalizing arrangement according to the circuit diagram of FIG. 9 with a total of N coefficients (N/2 in each of the sections A and B) to whose input samples are applied at the frequency 2/T. FIG. 12 clearly shows the advantage of the equalizing arrangement according to the invention. In the known equalizing arrangement with a number of 30 coefficients the noise level is by no means achieved, whereas this result is already achieved with 17 coefficients using the equalizing arrangement according to the invention.

The equalizing arrangement according to FIG. 8 includes two transversal filters $6_A$ and $6_B$ to whose inputs samples $x(i\mathrm{T})$ and samples corresponding to $x(i\mathrm{T}/\mathrm{T}/2)$ in the embodiment in which circuit 33 is a delay circuit with a delay of T/2, are applied. The number of transversal filters can be further increased by applying to their inputs samples of different interpolation signals which are derived from the signal $x(t)$ at the output of the transmission channel. At the expense of a more complicated structure the number of variables used to minimize the means-square error can be increased so that in certain cases the equalization quality can be further improved.

FIG. 13 shows by way of example an equalizing arrangement including four transversal filters as a modification of the equalizing arrangement of FIG. 8. Likewise as in FIG. 8 the samples $x(i\mathrm{T})$ of the signal $x(t)$ originating from the sampler $3_A$ are applied to a transversal filter $6_A$. The samples $x(i\mathrm{T} - \mathrm{T}/4)$ originating from a sampler $3_B$ connected to a delay circuit $33_B$ having a delay of T/4 are applied to a transversal filter $6_B$. The samples $x(i\mathrm{T} - \mathrm{T}/2)$ originating from a sampler $3_C$ connected to the output of the cascade arrangement of the delay circuit $33_B$ and a delay circuit $33_C$ likewise having a delay of T/4 are applied to a transversal filter $6_C$. The samples $x(i\mathrm{T} - 3\mathrm{T}/4)$ originating from a sampler $3_D$ connected to the output of the cascade arrangement of three delay circuits $\times_B$, $33_C$ and $33_D$ each having a delay of T/4 are applied to a transversal filter $6_D$. The four samplers $3_A$, $3_B$, $3_C$ and $3_D$ operate synchronously and this at the frequency 1/T. Of the four transversal filters $6_A$, $6_B$, $6_C$ and $6_D$ only the summing circuits $8_A$, $8_B$, $8_C$ and $8_D$ are shown which are connected to the inputs of a summing circuit 56. The sufficients of these four transversal filters are adjusted independently of each other with the aid of adjusting arrangements $11_A$, $11_B$, $11_C$ and $11_D$ forming part of control loops $9_A$, $9_B$, $9_C$ and $9_D$ connected to the difference producer 10.

An embodiment equivalent to the equalizing arrangement according to the FIG. 13 is shown in FIG. 14. The sampler 3 for the signal $x(t)$ is controlled by pulses of the frequency 4/T originating from a frequency multiplier 57 multiplying the frequency 1/T of the pulses from the clock pulse generator 4 by a factor of 4. The samples at the output of the sampler 3 are applied in a transversal filter 58 to a cascade arrangement of delay circuits $R_2$ each having a delay of T/4. In this embodiment it can be assumed that samples $x(i\mathrm{T})$ are available at taps $S_A$ which are separated from one another by 4 delay circuits $R_2$, samples $x(i\mathrm{T} - \mathrm{T}/4)$ are available at the taps $S_B$ separated from the taps $S_A$ by one delay circuit $R_2$, samples $x(i\mathrm{T} - \mathrm{T}/2)$ are available at the taps $S_C$ separated from the taps $S_B$ by one delay circuit $R_2$ and finally samples $x(i\mathrm{T} - 3\mathrm{T}/4)$ are available at the taps $S_D$ separated from the taps $S_C$ by one delay circuit $R_2$. The samples at all these taps $S_A$, $S_B$, $S_C$ and $S_D$ are applied to multipliers (not shown) and multiplied by coefficients originating from memories (not shown) and the output of these multipliers is connected to a summing circuit 59. The summing circuit includes a control terminal 60 connected to the output of the clock pulse generator 4 of the frequency 1/T so that samples of the frequency 1/T are obtained at the output of the transversal filter 58. The coefficients of the transversal filter 58. The coefficients of the transversal filter 58 are adjusted by means of an adjusting arrangement 61 forming part of a control loop 62 connected to the difference producer 10.

All embodiments hitherto described relate to equalizing arrangements of the non-recursive type. The steps according to the invention may, however, alternatively be used in equalizing arrangements of the recursive type in which in addition to a non-recursive section arranged between output of the transmission channel and input of the decision circuit a recursive section is also present which is arranged between output and input of the decision circuit. These recursive equalizing arrangements are generally used when the transmission lines not only bring about the amplitude and delay distortions already referred to, but also exhibit echo phenomena.

In the embodiments to be described hereinafter of the equalizing arrangements according to the invention with a recursive structure the non-recursive section may be formed in the same manner as in the embodiments already described. It is advantageous to use those embodiments which make it possible to obtain with certainty the "minimum minimorum" of the mean-square error.

FIG. 15 shows a simplified circuit diagram of such an equalizing arrangement with a recursive structure. In FIG. 15 the equalizing arrangement is connected to the output of a transmission channel 102. Data signals having a data clock frequency of 1/T are applied by a source 101 present in the transmitter to the input of this transmission channel 102.

This equalizing arrangement includes a non-recursive section 103 which is formed in the same manner as that in FIG. 1. This section 103 includes a sampler 104 for the data signal at the output of the transmission channel 102 which is controlled by pulses from a clock generator 105. The sampling phase is varied by the adjusting signal applied to a control terminal 106 of a phase shifting circuit 107. These samples may be coded by an analog-to-digital converter (not shown) if the other elements of the equalizing arrangement are of the digital type. The samples are applied to a transversal filter 108 whose output is connected to a decision circuit 109. A difference producer 111 is connected to the decision circuit 109 and the error signal originating therefrom is applied to two control loops 112 and 113 adjusting the coefficients of the transversal filter 108 and the phase of the sampling instants in the sampler 104. The coefficients of the transversal filter 108 are adjusted by means of an adjusting arrangement 114 forming part of the control loop 112. The sampling phase is adjusted by means of an adjusting arrangement 115 forming part of the control loop 113. The phase adjusting signal produced by this adjusting arrangement 115 is applied to the control terminal 106 of the phase shifting circuit 107. The operation of this non-recursive section 103 has been extensively described hereinbefore.

FIG. 16 shows a time diagram in which the impulse response of a transmission channel exhibiting echo phenomena is diagrammatically shown. For an isolated transmitted symbol the received signal has the shape shown in FIG. 16. For a transmission channel only exhibiting amplitude and delay distortions the received signal has the shape of the broken-line curve *a* located within an interval $(t_1, t_2)$ on either side of the reference instant $t_0$. This interval is, for example, 2 msec. The solid lines separated by an interval T represent samples originating from the sampler 104. The section 103 of the equalizing arrangement hitherto described is eminently suitable for eliminating interferences occurring between successive impulse response having a shape such as curve *a* and correspond to symbols transmitted at the frequency 1/T. The impulse response of a transmission channel in which echoes also occur additionally includes an echo signal as shown by the broken-line curve *b* located within the interval ($t'_1$, $t'_2$) on either side of the instant $t'_o$. This echo signal *b* may have an amplitude which is not negligible as compared with the main signal *a* and is separated therefrom by an interval ($t_o$, $t'_o$) which is, for example, 15 msec. In that case not only interferences due to amplitude and delay distortions occur, but also interferences occur between the main signals and echo signals. At the instant $t_o$, for example, interference occurs between the main signal *a* corresponding to a transmitted symbol and the echo signal *b* corresponding to a symbol transmitted 15 msec earlier.

In order to simultaneously suppress interference due to said distortions and those due to echoes, the equalizing arrangement of FIG. 15 not only includes the non-recursive section 103, but also a recursive section 116 constituted by a transversal filter 117 whose input is connected to the output of the decision circuit 109 and whose output is connected to the input of the decision circuit 109 through a summing circuit 118 combining the samples at the outputs of the transversal filters 108 and 117. The error signal provided by the difference producer 111 is also applied to a control loop 119 in order to adjust the coefficients of the transversal filter 117 in such a manner that the mean-square error is minimized. As described in the foregoing this adjustment is effected in an iterative manner using the steepest descent algorithm. The control loop 119 includes an adjusting arrangement 120 for adjusting the coefficients of the transversal filter 117. This adjusting arrangement 120 has a structure and an operation analogous to that of the adjusting arrangement 114 for the coefficients of the transversal filter 108 so that it need not be described any further.

A transmission channel exhibiting echoes of the type shown in FIG. 16 is equalized in the following manner. The transversal filter 108 of the non-recursive section 103 accounts for the pulse response in the interval ($t_1$, $t_2$) which corresponds to the amplitude and delay distortions. As already described the coefficients of transversal filter 108 are automatically adjusted in such a manner that the equalized pulse response substantially only includes a single central sample equal to 1. The transversal filter 117 of the recursive section 116 includes, likewise as any transversal filter, a cascade arrangement of delay circuits (not shown) for storing the pulse response in the interval ($t_o$, $t'_2$) while the coefficients of this transversal filter are automatically adjusted in such a manner that the echo signal *b* in the interval ($t'_1$, $t'_2$) is reduced to zero.

The structure of the non-recursive section 103 in FIG. 15 is certainly not the simplest one and sometimes gives rise to false minima in the mean-square error, as has been stated in the foregoing. For this section 103 all modifications already described may be used. FIGS. 17 shows a circuit diagram of the embodiment which generally yields an optimum equalization. In this Figure the elements corresponding to those in FIG. 15 have the same reference numerals.

The non-recursive section 103 in FIG. 17 includes a sampler 104 which is controlled by twice the data clock frequency and hence a frequency of 2/T, which is derived from the frequency 1/T of a clock generator 105 with the aid of a frequency doubler 103. The series of samples of frequency 2/T is decomposed in two interlaced series of samples each having a frequency of 1/T by a distributor 131 in the form of a two-position change-over switch controlled by the signals at two outputs of a modulo-2-counter 132 counting the pulses of the frequency 2/T at the output of frequency doubler 130. One output of distributor 131 applies a first series of samples of the data signal to a transversal filter $108_A$. The second output of distributor 131 applies a second series of samples of the data signal shifted over a time T/2 to a transversal filter $108_B$. For further processing this time shift is conpensated for a delay circuit 133 connected to the input of the transversal filter $108_A$. Apart from the number of elements the two transversal filters $108_A$ and $108_B$ have the same structure. Each of these transversal filters includes a cascade arrangement of delay circuits $R_A$ and $R_B$ each having a delay of T, and multipliers $P_A$ and $P_B$ to which the samples originating from the taps of the delay circuits on the one hand and the coefficients stored in the memories $m_A$ and $m_B$ on the other hand are applied. The output of the multipliers $P_A$, $P_B$ is connected to inputs of summing circuits $S_A$ and $S_B$, respectively, whose output samples are combined in a summing circuit 134 which is connected to the input of the decision circuit 109. It has been shown in the foregoing that this structure using two transversal filters $108_A$ and $108_B$ with variable coefficients functions as if the samples at the input of the decision circuit 109 have a variable amplitude and phase. For the equalization the error signal supplies by the difference producer 111 is applied to the adjusting arrangements $114_A$ and $114_B$ which in accordance with the steepest descent algorithm modify the coefficients stored in the memories $m_A$ and $m_B$ so as to minimize the mean-square error.

The recursive section 116 in FIG. 17 includes the transversal filter $108_C$ which is provided with a cascade arrangement of delay circuits $R_C$ each having a delay of T and whose input is connected to the output of the decision circuit 109. The transversal filter $108_C$ includes multipliers $P_C$ to which the samples originating from the taps of the delay circuits on the one hand and the coefficients stored in the memories $m_C$ on the other hand are applied. The output of the multipliers $P_C$ is connected to the input of the summing circuit 134 through a summing circuit $S_C$. For equalization the error signal supplied by the difference producer 111 is applied to the adjusting arrangement $114_C$ which in accordance with the steepest descent algorithm modifies the coefficients stored in the memories $m_C$ so as to minimize the mean-square error.

The non-recursive section 103 in which the coefficients of the transversal filters $108_A$ and $108_B$ are adjusted by means of adjusting arrangements $114_A$ and $114_B$ corrects the amplitude and delay distortions and so the special advantages already mentioned of this structure are obtained. The recursive section 116 in which the coefficients of the transversal filter $108_C$ are adjusted by means of the adjusting arrangement $114_C$ corrects the echo distortions. If the transmission channel 102 does not exhibit any echoes, the non-recursive section 103 with the transversal filters $108_A$ and $108_B$ operates, while the coefficients of the transversal filter $108_C$ of the recursive section 116 are all 0. This recursive section 116 only operates in so far as the transmission channel causes echoes so that the drawback of error multiplication is avoided as much as possible.

The circuit diagram of FIG. 17 clearly shows the difference between the equalizing arrangement according to the invention and the known recursive equalizing arrangement, an embodiment of which has been described in the third of the above-mentioned Articles. By omission of the transversal filter $108_B$ in FIG. 17 the circuit diagram of the known equalizing arrangement is obtained. The specific advantages of the equalizing arrangement provided with two transversal filters $108_A$ and $108_B$ are then, however, lost and the equalization with respect to the amplitude and delay distortions is less satisfactory due to phase jitter of the local clock generator 105. The equalizing arrangement of FIG. 17 is, however, insensitive to this phase jitter of the local clock generator 105 controlling the sampler 104 because it is the sampling phase which is an extra control parameter for the equalization thanks to the steps according to the invention. The error multiplication caused by the structure of the recursive section necessitates the use of a training sequence for the start of the equalization in the known equalizing arrangement. By addition of the transversal filter $108_B$ to the known equalizing arrangement the equalization is considerably improved while the said drawbacks are eliminated. Particularly, the equalizing arrangement can generally be started directly by the data signal in accordance with a very simple method. Firstly, the transversal filter $108_C$ is rendered inoperative so that only the non-recursive section 103 operates which compensates for the amplitude and delay distortions. A generally low error percentage of the order of several per cent is then very rapidly obtained. Subsequently, the transversal filter $108_C$ is put into operation for the compensation of the echo distortions and the complete equalization can be carried out accurately because the errors have already been greatly reduced.

The use of the equalizing arrangements according to FIGS. 15 and 17 is not limited to the equalization of transmission channels exhibiting unwanted echoes. These equalizing arrangements may alternatively be used in transmission systems using partial response coding such as, for example, second order bipolar coding. In such transmission systems echoes are deliberately generated so as to facilite the filter processes. The equalizing arrangements according to FIGS. 15 and 17 are eminently suitable for suppresing this type of echoes.

What is claimed is:

1. An automatic equalizing arrangement for a data transmission channel, including a first transversal filter coupled between a first sampler for the data signal at the output of the transmission channel and a data-restoring decision circuit, the coefficients of the first transversal filter being adjusted by a coefficient adjusting arrangement in a first control loop so as to minimize a predetermined function of an error signal originating from a difference producer connected between input and output of the decision circuit and being applied to said first control loop, characterized in that means are provided for varying the phase of the sampling instants so as to minimize said predetermined function of said error signal, said means for varying the phase of the sampling instants including a phase adjusting arrangement in a second control loop, said error signal being applied to said second control loop.

2. An equalizing arrangement as claimed in Claim 1, characterized in that a differentiating network and a second sample are connected in cascade to the output of the transmission channel, said second sampler being synchronously controlled with the first sampler by pulses from a local clock generator having a frequency equal to the data clock frequency and a variable phase controlled by a phase shifting circuit, the samples of the second sampler in the phase adjusting arrangement being applied to a second transversal filter in which the same coefficients are adjusted as in the first transversal filter, the output of the second transversal filter and the output of the difference producer being connected to the input of a circuit arrangement producing a phase adjusting signal for adjusting the phase shifting circuit.

3. An equalizing arrangement as claimed in claim 2, characterized in that the equalizing arrangement includes in cascade a sampler and a transversal filter which by means of a cummutating arrangement are alternately active within a data clock period as the first sampler and as the first transversal filter, and as the second sampler and as the second transversal filter, respectively, said commutating arrangement being controlled by signals derived from the local clock generator and connecting the input of the sampler to the output of the transmission channel and the output of transversal filter to the input of the decision circuit for obtaining the adjusting signal of the coefficients. and connecting the input of the sampler to the output of the differentiating network and the output of the transversal filter to an input of the phase adjusting arrangement for obtaining the phase adjusting signal.

4. An equalizing arrangement as claimed in claim 1, characterized in that the samples at the input of the first transversal filter are supplied by a linear interpolation circuit including an adder having two inputs which are connected through two branches to the output of the transmission channel, samples of a first and a second interpolation signal derived from the received data signal being applied to said branches, the samples in the second branch being weighted in accordance with a coefficient by means of a multiplier, the samples in the two branches being supplied by samplers controlled by pulses from a local clock generator with a fixed phase and a frequency which is equal to the data clock frequency, the samples of the second interpolation signal being furthermore applied in the phase adjusting arrangement to a second transversal filter in which the same coefficients are adjusted as in the first transversal filter, the output of the second transversal filter and the output of the difference producer being connected to the input of a circuit arrangement producing a coefficient adjusting signal for said multiplier.

5. An equalizing arrangement as claimed in claim 1. characterized in that the samples at the input of the decision circuit are obtained by summation in an adder of samples originating from two branches of the arrangement, the first branch including the first transversal filter receiving the samples of a first interpolation signal derived from the received data signal, the second branch including a second transversal filter in which the same coefficients as in the first transversal filter are adjusted, said second transversal filter receiving the samples of a second interpolation signal derived from the received data signal, the output samples of the second transversal filter being weighted in accordance with a coefficient by means of a multiplier, the samples in the two branches being furthermore supplied by samplers controlled by pulses from a local clock generator with a fixed phase and a frequency which is equal to the data clock frequency, the output of the second transversal filter and the output of the difference producer being connected to the input of a circuit arrangement producing a coefficient adjusting signal for said multiplier.

6. An equalizing arrangement as claimed in claim 4 characterized in that the interpolation signal in the first branch is the received data signal.

7. An equalizing arrangement as claimed in claim 6, characterized in that the interpolation signal in the second branch is derived from the received data signal by means of a delay circuit.

8. An equalizing arrangement as claimed in claim 6, characterized in that the interpolation signal in the second branch is derived from the received data signal by means of a differentiating network.

9. An equalizing arrangement as claimed in claim 4 characterized in that the interpolation signals in the two branches are derived from the received data signal by means of circuits causing different delays in each branch.

10. An equalizing arrangement as claimed in claim 1, characterized in that the samples at the input of the decision circuit are obtained by summation in an adder of samples originating from at least two branches of the arrangement each including a transversal filter to which samples of an interpolation signal are applied which is derived from the received data signal and which is different in each branch, the samples in all branches being supplied by samplers controlled by pulses from a local clock generator with a fixed phae and a frequency which is equal to the data clock frequency, the coefficients of the transversal filters in each branch being separately adjusted by means of a separate coefficient adjusting arrangement forming part of a separate control loop to which the error signal is applied.

11. An equalizing arrangement as claimed in claim 10, characterized in that the interpolation signal in one branch is the received data signal.

12. An equalizing arrangement as claimed in claim 11, characterized in that the interpolation signals in the other branches are derived from the received data signal by means of delay circuits.

13. An equalizing arrangement as claimed in claim 11, characterized in that the interpolation signals in the other branches are derived from the received data signal by means of differentiating networks.

14. An equalizing arrangement as claimed in claim 10, characterized in that the interpolation signals in the different branches are derived from the data signal by means of delay circuits.

15. An equalizing arrangement as claimed in claim 12 in which the delays of the samples in each branch are multiples of a value $T/n$ where T represents the period of the data clock frequency and $n$ is an integer greater than 1, characterized in that the transversal filters of the different branches are arranged in series so as to form a single transversal filter including at its input a sampler for the received data signal controlled by pulses from a local clock generator with a fixed phase and a frequency which is equal to n times the data clock frequency, said latter transversal filter being controlled in such a manner that samples of the data clock frequency are applied to the decision circuit, the coefficients of said latter transversal filter being adjusted by means of a coefficient adjusting arrangement forming part of a control loop to which the error signal is applied.

16. An equalizing arrangement as claimed in claim 1, characterized in that the equalizing arrangement also includes a recursive section in the form of an additional transversal filter arranged between input and output of the decision circuit, the coefficients of the additional transversal filter being adjusted by a coefficient adjusting arrangement in an additional control loop so as to minimize a predetermined function of the error signal, said error signal being applied to said additional control loop.

* * * * *

UNITED STATES PATENT AND TRADEMARK OFFICE

CERTIFICATE OF CORRECTION

PATENT NO. : 3,868,603

DATED : February 25, 1975

INVENTOR(S) : LOIC BERNARD YVES GUIDOUX

It is certified that error appears in the above-identified patent and that said Letters Patent are hereby corrected as shown below:

IN THE SPECIFICATION

Col. 5, line 26, "2N = 1" should be --2N + 1--;

line 46, equation (3) should read:

$$--f = E\left\{[e(iT)]^2\right\} = E\left\{[y(iT) - \theta i]^2\right\}--;$$

Col. 6, line 24, equation (6) should read:

$$--a_k^{j+1} = a_k^j - \Delta \cdot E\left\{e^j(iT) \cdot x\,[(i-k)T]\right\}--;$$

Col. 7, line 13, "= -T." should be -- = +T.--;

Col. 8, line 29, equation (10) should read:

$$--a_k^{j+1}\ 1\ a_k^j - \alpha\left[\frac{\partial f(a_k,\ to)}{\partial\ a_k}\right]^j--;$$

line 30, equation (11) should read:

$$--to^{j+1} = to^j - \alpha\left[\frac{\partial f(a_k,\ to)}{\partial\ to}\right]^j--;$$

Col. 9, line 41, "60' " should be --6'--;

line 54, "x(t)" should be --$\dot{x}$(t)--;

Col. 10, line 42, "x(t)" should be --$\dot{x}$(t)--;

UNITED STATES PATENT AND TRADEMARK OFFICE
CERTIFICATE OF CORRECTION

PATENT NO. : 3,868,603 Page 2

DATED : February 25, 1975

INVENTOR(S) : LOIC BERNARD YVES GUIDOUX

It is certified that error appears in the above-identified patent and that said Letters Patent are hereby corrected as shown below:

Col. 10, line 45, "x(t)" should be --$\dot{x}(t)$--;

line 50, "x(t)" should be --$\dot{x}(t)$--;

line 51, "x(t)" should be --$\dot{x}(t)$--;

Col. 11, line 5, "x(t)" should be --$\dot{x}(t)$--;

Col. 13, line 16, equation (14) should read:

--$x(to + iT) \approx x(iT)\ \emptyset_o \dot{x}(iT)$--;

line 21, "x(iT)" should be --$\dot{x}(iT)$--;

line 22, "x(t)" should be --$\dot{x}(t)$--(both occurences)

line 27, "x(iT)" should be --$\dot{x}(iT)$--;

line 31, "x(iT)" should be --$\dot{x}(iT)$--;

line 32, "x(t)" should be --$\dot{x}(t)$--;

line 34, "$\emptyset_o \cdot x(iT)$" should be --$\emptyset_o \cdot \dot{x}(iT)$--;

line 35, "x(iT)" should be --$\dot{x}(iT)$--;

Col. 16, line 6, in equation (23);"[(i-1)T]" should be --[(i-k)T]--;

UNITED STATES PATENT AND TRADEMARK OFFICE

CERTIFICATE OF CORRECTION

PATENT NO. : 3,868,603 Page 3

DATED : February 25, 1975

INVENTOR(S) : LOIC BERNARD YVES GUIDOUX

It is certified that error appears in the above-identified patent and that said Letters Patent are hereby corrected as shown below:

Col. 17, line 29, "$x_D(iT)$ $x(iT)$" should be --$x_D(iT)$ or $\dot{x}(iT)$--;

line 54, in equation (24) "[(-1)T]" should be --[(i-1)T]--;

Col. 18, line 17, equation (27) should read:

$$--a_k^{j+1} = a_k^j - \Delta \cdot E \left\{ e^j(iT) \cdot x[(i-k)T] \right\} --;$$

line 23, equation (28) should read:

$$--b_1^{j+1} = b_1^j - \Delta \cdot E \left\{ e^j(iT) \cdot x_D[(i-1)T] \right\} --;$$

Col. 21, line 30, "$X_B$" should be --$33_B$--;

line 66, cancel "The coefficients of the transversal filter";

line 67, cancel "58.";

Col. 24, line 5, "103" should be --130--;

line 17, "conpensated" should be --compensated--;

UNITED STATES PATENT AND TRADEMARK OFFICE

CERTIFICATE OF CORRECTION

PATENT NO. : 3,868,603

DATED : February 25, 1975

INVENTOR(S) : LOIC BERNARD YVES GUIDOUX

It is certified that error appears in the above-identified patent and that said Letters Patent are hereby corrected as shown below:

IN THE CLAIMS

Claim 3, line 4, cummutating" should be --commutating--;

Claim 9, line 1, after "4" insert -- , --;

Claim 10, line 10, "phae" should be --phase--;

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*